United States Patent
Naono et al.

(10) Patent No.: US 7,698,423 B2
(45) Date of Patent: Apr. 13, 2010

(54) COMPUTER SYSTEM FOR ESTIMATING OPERATIONAL RISK

(75) Inventors: Ken Naono, Tokyo (JP); Masashi Egi, Kokubunji (JP); Takao Sakurai, Kokubunji (JP)

(73) Assignees: Hitachi, Ltd., Tokyo (JP); Hitachi Systems & Services, Ltd., Tokyo (JP)

( * ) Notice: Subject to any disclaimer, the term of this patent is extended or adjusted under 35 U.S.C. 154(b) by 216 days.

(21) Appl. No.: 12/003,993

(22) Filed: Jan. 4, 2008

(65) Prior Publication Data
US 2008/0177877 A1 Jul. 24, 2008

(30) Foreign Application Priority Data
Jan. 24, 2007 (JP) ............................. 2007-013497

(51) Int. Cl.
*G06F 15/173* (2006.01)
(52) U.S. Cl. ..................................... 709/224
(58) Field of Classification Search ................ 707/100, 707/8; 709/229, 239, 241, 247, 223, 224, 709/225; 370/238, 408, 402, 466, 392, 393
See application file for complete search history.

(56) References Cited

U.S. PATENT DOCUMENTS

2003/0149657 A1* 8/2003 Reynolds et al. .............. 705/38
2006/0074976 A1   4/2006 Cauvin et al.

FOREIGN PATENT DOCUMENTS

| CN | 1726473 A | 12/2003 |
|----|-----------|---------|
| CN | 1755253 A | 9/2004 |
| JP | 2004-362429 | 6/2003 |

OTHER PUBLICATIONS

Office Action from Chinese Patent Office mailed Aug. 28, 2009.

* cited by examiner

*Primary Examiner*—Nathan Flynn
*Assistant Examiner*—Mark O Afolabi
(74) *Attorney, Agent, or Firm*—Stites & Harbison PLLC; Juan Carlos A. Marquez, Esq.

(57) ABSTRACT

A computer system comprising a plurality of first computers each operated by an operator and a second computer coupled via a network to the plurality of first computers. Each of the plurality of first computers executes at least one software, obtains operation information by the operator with respect to the at least one software to be executed, receives an input of information from the operator, displays a confirm window for the operator to check whether the received input information is correct or not, calculates operation time period about the displayed confirm window based on the obtained operation information; and sends the calculated operation time period about the confirm window to the second computer. The second computer receives the operation time period about the confirm window, and calculates the number of operations of which the received operation time period about the confirm window is shorter than a first threshold value.

18 Claims, 16 Drawing Sheets

|  1501 | 1502 | 1503 | 1504 | 1505 |
|---|---|---|---|---|
| WINDOW TITLE | FILE NAME | DANGEROUS LEVEL | CAUTION LEVEL | STANDARD LEVEL |
| INPUT 70 | http://zaimu.input70.htm | LESS THAN 2.0 SEC | LESS THAN 4.0 SEC | 6.0 (SEC) |
| CONFIRM 71 | http://zaimu.confirm71.htm | LESS THAN 3.5 SEC | LESS THAN 5.5 SEC | 7.5 (SEC) |
| INPUT 72 | http://zaimu.input72.htm | LESS THAN 3.5 SEC | LESS THAN 5.5 SEC | 7.5 (SEC) |
| CONFIRM 73 | http://zaimu.confirm73.htm | LESS THAN 2.5 SEC | LESS THAN 4.5 SEC | 6.5 (SEC) |
| INPUT 74 | http://zaimu.input74.htm | LESS THAN 4.0 SEC | LESS THAN 6.0 SEC | 8.0 (SEC) |
| CONFIRM 75 | http://zaimu.confirm75.htm | LESS THAN 3.0 SEC | LESS THAN 5.0 SEC | 7.0 (SEC) |
| DANGER 80 | http://zaimu.kiken.confirm.htm | LESS THAN 6.0 SEC | LESS THAN 8.0 SEC | 10.0 (SEC) |
| CAUTION 81 | http://zaimu.tyuui.confirm.htm | LESS THAN 6.0 SEC | LESS THAN 8.0 SEC | 10.0 (SEC) |

| 601 | 602 | 603 | 604 | 605 |
|---|---|---|---|---|
| DATE | TIME | WINDOW TITLE | OPERATION TIME | JUDGEMENT LEVEL |
| July 24, 2006 | 09:02 | INPUT 70 | 4.173 SEC | STANDARD |
| July 24, 2006 | 09:02 | CONFIRM 71 | 5.649 SEC | STANDARD |
| July 24, 2006 | 09:07 | INPUT 72 | 2.275 SEC | DANGER |
| July 24, 2006 | 09:08 | CONFIRM 73 | 7.172 SEC | STANDARD |

|  | 1401 START | 1402 END |
|---|---|---|
| DATE | July 24, 2006 | July 30, 2006 |
| TIME | 08:00 | 24:00 |

| DATE | TIME | WINDOW TITLE | OPERATION TIME | CRITERION LEVEL | OPERATOR NAME | DEPARTMENT | SECTION |
|---|---|---|---|---|---|---|---|
| July 24, 2006 | 09:02 | INPUT 70 | 4.173 SEC | STANDARD | SMITH | ACCOUNTING DEP. | ACCOUNTING SEC. |
| July 24, 2006 | 09:02 | CONFIRM 71 | 5.649 SEC | STANDARD | SMITH | ACCOUNTING DEP. | ACCOUNTING SEC. |
| July 24, 2006 | 09:07 | INPUT 72 | 2.275 SEC | DANGER | SMITH | ACCOUNTING DEP. | ACCOUNTING SEC. |
| July 24, 2006 | 09:08 | CONFIRM 73 | 7.172 SEC | STANDARD | SMITH | ACCOUNTING DEP. | ACCOUNTING SEC. |
| July 24, 2006 | 09:12 | INPUT 74 | 2.028 SEC | CAUTION | JONES | ACCOUNTING DEP. | ACCOUNTING SEC. |
| July 24, 2006 | 09:12 | CONFIRM 75 | 5.903 SEC | STANDARD | JONES | ACCOUNTING DEP. | ACCOUNTING SEC. |
| July 24, 2006 | 09:15 | INPUT 70 | 4.709 SEC | STANDARD | ANDERSON | ACCOUNTING DEP. | ACCOUNTING SEC. |
| July 24, 2006 | 09:15 | CONFIRM 71 | 4.534 SEC | CAUTION | ANDERSON | ACCOUNTING DEP. | ACCOUNTING SEC. |

FIG. 6

COMPUTER SYSTEM FOR ESTIMATING OPERATIONAL RISK

CLAIM OF PRIORITY

The present application claims priority from Japanese patent application JP 2007-013497 filed on Jan. 24, 2007, the content of which is hereby incorporated by reference into this application.

BACKGROUND OF THE INVENTION

This invention relates to a computer system including a plurality of first computers operated by an operator, and more particularly, to a technology of calculating a risk caused by an operation mistake of the operator.

In an information system over the recent years, an operator including an employee etc. performs a variety of operations by use of an operation computer (worker's operation PC). In this type of information system, it is important to monitor an operating state of the operator in order to prevent a trouble such as a leakage of information.

Further, a problem in the information system is a mis-operation by the operator. Especially in these days, the operators conduct the mis-operations frequently in the information system that deals with customer information and information on amount of money, which is a serious incident.

JP 2004-362429 A discloses a touch panel for detecting the mis-operation by the operator. The touch panel disclosed in JP 2004-362429 A includes contact interval detecting means, vibration detecting means, and input determining means. Specifically, the touch panel disclosed in JP 2004-362429 A detects the mis-operation based on a period of time since a finger of the operator has separated from the touch panel till the finger of the operator touches the touch panel next time.

SUMMARY OF THE INVENTION

The technology disclosed in JP 2004-362429 A enables the detection of the mis-operation by the operator. This technology, however, requires a program for measuring the operation time for every piece of software. Further, a risk caused by the mis-operation can not be quantitatively calculated.

This invention has been devised in view of the problems described above, and therefore has an object to provide a computer system that calculates the risk cased by the mis-operation.

A representative aspect of this invention is as follows. That is, there is provided a computer system comprising: a plurality of first computers each operated by an operator and having a processor, a memory and an interface; and a second computer coupled via a network to the plurality of first computers and having a processor, a memory and an interface. Each of the plurality of first computers executes at least one software, obtains operation information by the operator with respect to the at least one software to be executed, receives an input of information from the operator, displays a confirm window for the operator to check whether the received input information is correct or not, calculates operation time period about the displayed confirm window based on the obtained operation information; and sends the calculated operation time period about the confirm window to the second computer. The second computer receives the operation time period about the confirm window, and calculates the number of operations of which the received operation time period about the confirm window is shorter than a first threshold value.

According to a representative embodiment of this invention, the risk arising due to the mis-operation can be calculated.

BRIEF DESCRIPTION OF THE DRAWINGS

The present invention can be appreciated by the description which follows in conjunction with the following figures, wherein:

FIG. 3 is a diagram of a configuration of a risk criterion management table stored in a worker's operation personal computer and in a summary server in accordance with the embodiment of this invention;

FIG. 4 is a diagram illustrating a configuration of a operation time record table stored in the worker's operation personal computer in accordance with the embodiment of this invention;

FIG. 5 is a diagram showing a configuration of a measurement time-span management table stored in the summary server in accordance with the embodiment of this invention;

FIG. 6 is a diagram showing a configuration of an operation time record gathering table stored in the summary server in accordance with the embodiment of this invention;

DETAILED DESCRIPTION OF THE PREFERRED EMBODIMENTS

An embodiment of this invention will hereinafter be described with reference to the drawings.

Figure 1:
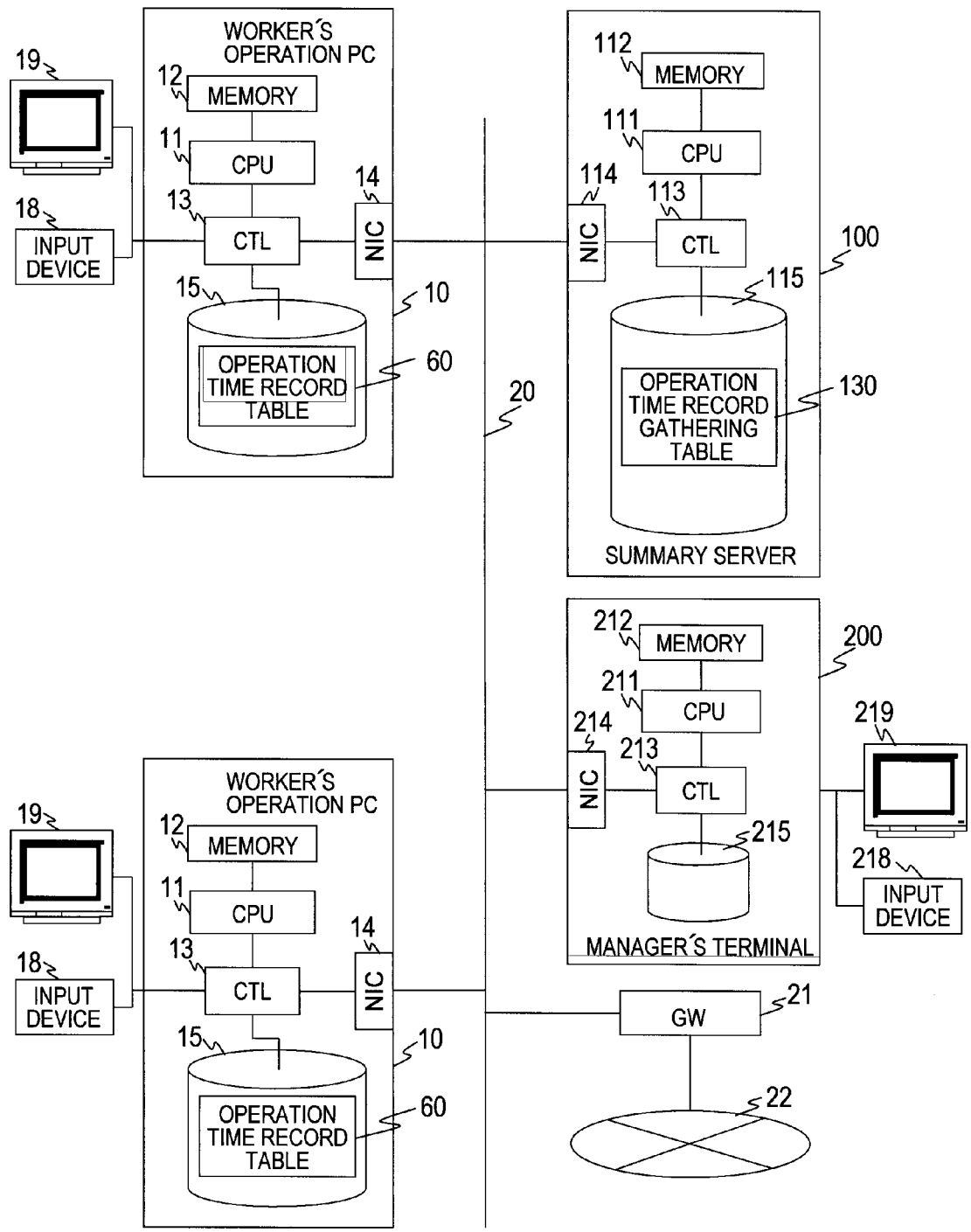
FIG. 1 is a block diagram showing a computer system configuration in accordance with an embodiment of this invention.

FIG. 1 is a block diagram showing a computer system configuration according to the embodiment of this invention.

The computer system includes a plurality of operation computers (worker's operation PCs) 10, a summary server 100, a manager's terminal 200, a network 20, a gateway device (GW) 21, and a wide area network (WAN) 22.

The network 20 connects the worker's operation personal computer 10, the summary server 100, the manager's terminal 200, and the gateway device 21 to each other. The gateway device 21 connects the network 20 to the WAN 22. The gateway device 21 is defined as, e.g., a router. The WAN 22 is, for example, the Internet or a local IP network.

The worker's operation personal computer 10 is operated by the operator including an employee etc., thereby executing a variety of processes. Further, the worker's operation personal computer 10 includes a CPU 11, a memory 12, a data transfer controller (CTL) 13, a network interface (NIC) 14, a storage device 15, an input device 18, and a display 19.

The CPU 11 runs a program stored in the memory 12, thereby executing the variety of processes. The memory 12 is temporarily stored with the program executed by the CPU 11 and information needed for the CPU 11. To be specific, the memory 12 is stored with an operating system (OS), an application, an operation monitoring agent, etc.

In-depth descriptions of the OS, the application, and the operation monitoring agent will be made with reference to FIG. 2.

The data transfer controller 13 controls data transfer among the CPU 11, the network interface 14, the storage device 15, the input device 18, and the display 19.

The network interface 14 is an interface connected to the network 20.

The storage device 15 is stored with various items of information. For example, the storage device 15 is stored with an operation time record table 60. The operation time record table 60 contains records about operation time with respect to a window displayed on the input device 18 included in the worker's operation personal computer 10. It should be noted that the operation time is a period of time till the operation corresponding to the window displayed on the input device 18 is finished since the operation has been started. Alternatively, the operation time is a period of time till the operation corresponding to the window displayed on the input device 18 is finished since the window has been displayed on the input device 18.

The record about the operation time, which is contained in the operation time record table 60, is transmitted at predetermined timing to the summary server 100.

The input device 18 receives an input of the information from the operator. For example, the input device 18 is exemplified such as a mouse or a keyboard. The display 19 displays the various items of information.

The manager's terminal 200 is operated by a manager of the computer system. The manager's terminal 200 sets, in the summary server 100, conditions used when analyzing a risk caused by a mistake in operation. Further, the manager's terminal 200 outputs an analyzed data result of the summary server 100.

The manager's terminal 200 includes a CPU 211, a memory 212, a data transfer controller (CTL) 213, a network interface (NIC) 214, a storage device 215, an input device 218, and a display 219.

The CPU 211 runs a program stored in the memory 212, thereby executing the variety of processes. The memory 212 is temporarily stored with the program executed by the CPU 211 and the information needed for the CPU 211. Specifically, the memory 212 is stored with a program for setting, in the summary server 100, the conditions used when analyzing the risk caused by the mis-operation and a program for outputting the analyzed data result of the summary server 100.

The data transfer controller 213 controls data transfer among the CPU 211, the network interface 214, the storage device 215, the input device 218, and the display 219.

The network interface 214 is an interface connected to the network 20. The storage device 215 is stored with various items of information.

The input device 218 receives an input of the information from the manager. For example, the input device 218 is exemplified such as the mouse or the keyboard. The display 219 displays the various items of information.

The summary server 100 includes a CPU 111, a memory 112, a data transfer controller (CTL) 113, a network interface (NIC) 114, and a storage device 115.

The CPU 111 runs the program stored in the memory 112, thereby executing the variety of processes. The memory 112 is temporarily stored with the program executed by the CPU 111 and the information required by the CPU 111. To be specific, the memory 112 is stored with a data base management system (DBMS) and a risk analysis application. It should be noted that the risk analysis application will be described in detail with reference to FIG. 2.

The data transfer controller 113 controls data transfer among the CPU 111, the network interface 114, and the storage device 115.

The network interface 114 is an interface connected to the network 20. The storage device 115 is stored with various items of information. For example, the storage device 115 is stored with an operation time record gathering table 130.

The summary server 100 receives the record about the operation time from each worker's operation personal computer 10. The summary server 100 stores the received record about the operation time in the operation time record gathering table 130. Further, the summary server 100 analyzes the risk caused by the mis-operation on the basis of the record about the operation time, which is stored in the operation time record gathering table 130.

Figure 2:
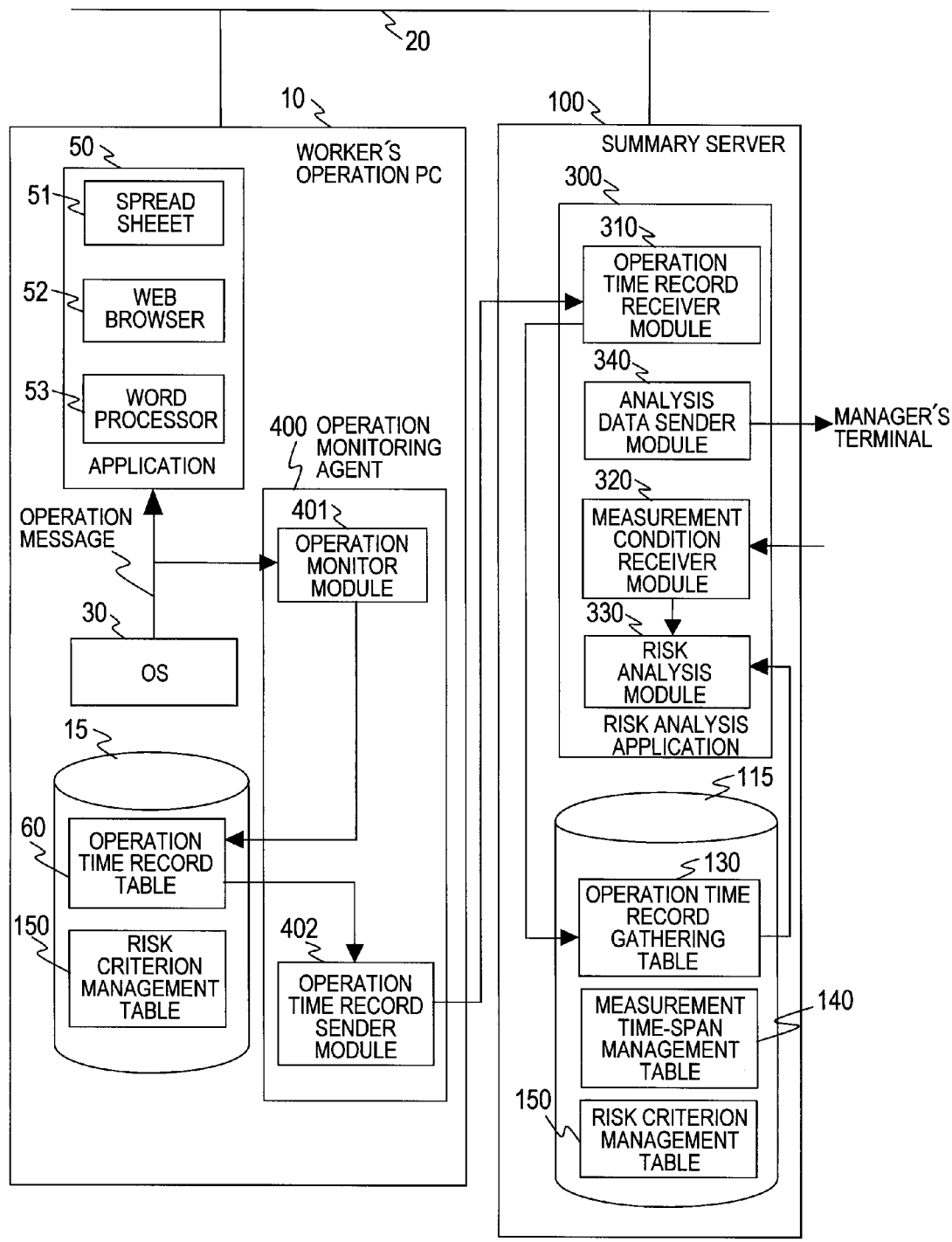
FIG. 2 is a block diagram showing a functional configuration of the computer system in accordance with the embodiment of this invention.

FIG. 2 is a block diagram showing a functional configuration of the computer system according to the embodiment of this invention.

The storage device 15 provided in the worker's operation personal computer 10 is stored with an operation time record table 60 and a risk criterion management table 150.

The risk criterion management table 150 manages a threshold value for outputting an alert against an operation of the operator. It should be noted that a detailed description of the risk criterion management table 150 will be explained with reference to FIG. 3. The operation time record table 60 contains the record about the operation time with respect to the window displayed on the input device 18 provided in the worker's operation personal computer 10. It should be noted that an in-depth description of the operation time record table 60 will be made with reference to FIG. 4.

Moreover, the storage device 15 provided in the worker's operation personal computer 10 may also be stored with an operation record table. The operation record table contains a record related to the operation of the operator with respect to an OS 30 and an application 50.

The worker's operation personal computer 10 executes the OS 30, the application 50, and an operation monitoring agent 400. The application 50 executes the variety of processes. For example, the application 50 is exemplified such as spreadsheet software 51, Web Browser software 52, or word processor software 53. Moreover, a probe may be added in (add-in) the application 50.

The OS 30 controls the whole of the processes by the worker's operation personal computer 10. For instance, the OS 30, upon detecting that the operator operates the input device 18, issues an operation message to the operation target application 50. It should be noted that the operation of the input device 18 is exemplified by a click of the mouse, a typing input of the keyboard, and the like.

The operation monitoring agent 400 includes an operation monitor module 401 and an operation time record sender module 402.

The operation monitor module 401 acquires the operation message issued to the application 50 from the OS 30 and an event handle based on the standard application program interface (API). Further, the operation monitor module 401 may also acquire the information from the probe added in (add-in) the application 50. The operation monitor module 401 calculates, based on the thus-acquired operation message and event handle, a period of operation time with respect to the window displayed on the input device 18.

The operation monitor module 401 stores the calculated operation time as a record in the operation time record table 60.

The operation monitor module 401 performs an alert determination on the basis of the calculated operation time and the risk criterion management table 150. For example, the operation monitor module 401 categorizes, based on the calculated operation time, the operation on the window into any one of a dangerous level, a caution level, and a standard level. The operation monitor module 401, when categorizing the operation on the window into one of the dangerous level and the caution level, gets an alert window displayed on the display 19.

The operation time record sender module 402 sends the record about the operation time, which has been stored in the operation time record table 60, to the summary server 100 at a predetermined cycle. It should be noted that the operation time record sender module 402 may delete, from the operation time record table 60, the record about the operation time, which has been sent to the summary server 100.

The storage device 115 provided in the summary server 100 is stored with the operation time record gathering table 130, a measurement time-span management table 140, and the risk criterion management table 150.

The operation time record gathering table 130 manages the record about the operation time with respect to the window displayed on the input device 18 provided in the worker's operation personal computer 10. It should be noted that the operation time record gathering table 130 will be described in detail with reference to FIG. 5.

The measurement time-span management table 140 manages a time-span (period) for which the operation time is measured. It should be noted that the in-depth description of the measurement time-span management table 140 will be made with reference to FIG. 6.

The risk criterion management table 150 shown in FIG. 3 is used for managing the threshold value for analyzing the risk caused due to the mis-operation. It should be noted that the risk criterion management table 150 is the same as the table stored in the storage device 15 provided in the worker's operation personal computer 10.

The summary server 100 executes the risk analysis application 300. The risk analysis application 300 analyzes the risk caused by the mis-operation. To be specific, the risk analysis application 300 includes an operation time record receiver module 310, a measurement condition receiver module 320, a risk analysis module 330, and an analysis data sender module 340.

The operation time record receiver module 310 receives the record about the operation time from the worker's operation personal computer 10. The operation time record receiver module 310 stores the received record in the operation time record gathering table 130.

The measurement condition receiver module 320 receives the measurement condition from the manager's terminal 200. The measurement condition receiver module 320 stores the measurement time-span management table 140 with the measurement time-span contained in the received measurement condition.

The risk analysis module 330 analyzes the risk caused due to the mis-operation on the basis of the measurement condition received by the measurement condition receiver module 320. The analysis data sender module 340 sends the analyzed data result of the risk analysis module 330 to the manager's terminal 200.

FIG. 3 is a diagram of a configuration of the risk criterion management table 150 stored in the worker's operation personal computer 10 and in the summary server 100 according to the embodiment of this invention.

The risk criterion management table 150 contains fields such as a window title 1501, a file name 1502, a dangerous level threshold value 1503, a caution level threshold value 1504, and a standard time 1505.

The window title 1501 is the field registered with an identifier unique to the window displayed on the input device 18 provided in the worker's operation personal computer 10. The file name 1502 is an identifier unique to a file for displaying the window identified by the window title 1501 of the record (a set of data in each row).

The dangerous level threshold value 1503 is a threshold value for determining whether the operation on the window identified by the window title 1501 of the record concerned is at the dangerous level or not. If the operation time on the window is equal to or smaller than the dangerous level threshold value 1503, the operation on the window is categorized as the dangerous level.

The caution level threshold value 1504 is a threshold value for determining whether the operation on the window identified by the window title 1501 of the record concerned is at the caution level or not. If the operation time on the window is equal to or smaller than the caution level threshold value 1504, the operation on the window is categorized as the caution level.

The standard time 1505 is standard time required for the operation with respect to the window identified by the window title 1501 of the record concerned. It should be noted that the dangerous level threshold value 1503 in this embodiment is set shorter by 4 seconds than the standard time 1505. Further, the caution level threshold value 1504 is set shorter by 2 seconds than the standard time 1505.

FIG. 4 is a diagram showing a configuration of the operation time record table 60 stored in the worker's operation personal computer 10 according to the embodiment of this invention.

The operation time record table 60 contains fields such as a date 601, a time 602, a window title 603, an operation time 604, and a criterion level 605.

One record contained in the operation time record gathering table 130 is associated with a single operation with respect to the window.

The date 601 represents a date when the operation associated with the relevant record is started. It should be noted that the date 601 may also specify a date when the operation associated with the relevant record is ended. The time 602 represents the time when the operation associated with the relevant record is started. It should be noted that the time 602 may also specify the time when the operation associated with the relevant record is ended. The window title 603 is an identifier unique to the window on which the operation associated with the relevant record is performed.

The operation time 604 is a period of time expended for the operation associated with the relevant record. For example, the operation time 604 is a length of the time till the operation associated with the relevant record is finished since the operation has been started. Alternatively, the operation time 604 is a length of time till the operation associated with the displayed window is finished since the window identified by the window title 603 of the record concerned has been displayed.

The criterion level 605 shows which category of the dangerous level, the caution level, and the standard level the operation associated with the relevant record comes under.

FIG. 5 is a diagram showing a configuration of the measurement time-span management table 140 stored in the summary server 100 according to the embodiment of this invention.

The measurement time-span management table 140 contains fields such as a starting date/time 1401 and an ending date/time 1402.

The starting date/time 1401 is a date and time when the measurement of the operation time is started. The ending date/time 1402 is a date and time when the measurement of the operation time is ended. It should be noted that the starting date/time 1401 and the ending date/time 1402 are set by the manager.

FIG. 6 is a diagram showing a configuration of the operation time record gathering table 130 stored in the summary server 100 according to the embodiment of this invention.

The operation time record gathering table 130 contains fields such as a date 1301, a time 1302, a window title 1303, an operation time 1304, a criterion level 1305, an operator name 1306, a department 1307 and a section 1308.

One record contained in the operation time record gathering table 130 is associated with a single operation with respect to the window.

The date 1301 represents a date when the operation associated with the relevant record is started. It should be noted that the date 1301 may also specify a date when the operation associated with the relevant record is ended. The time 1302 represents the time when the operation associated with the relevant record is started. It should be noted that the time 1302 may also specify the time when the operation associated with the relevant record is ended. The window title 1303 is an identifier unique to the window on which the operation associated with the relevant record is performed.

The operation time 1304 is a period of time expended for the operation associated with the relevant record. For example, the operation time 1304 is a length of the time till the operation associated with the relevant record is finished since the operation has been started. Alternatively, the operation time 1304 is a length of time till the operation associated with the displayed window is finished since the window identified by the window title 1303 of the record concerned has been displayed.

The criterion level 1305 shows which category of the dangerous level, the caution level, and the standard level the operation associated with the relevant record comes under. The operator name 1306 is defined as an identifier unique to the operator performing the operation associated with the relevant record.

The department 1307 is an identifier unique to a department to which the operator identified by the operator name 1306 in the record concerned belongs. The section 1308 is an identifier unique to a section to which the operator identified by the operator name 1306 in the record concerned belongs.

Next, a case where the worker's operation personal computer 10 is utilized for ordering a certificate will be described.

Figure 7:
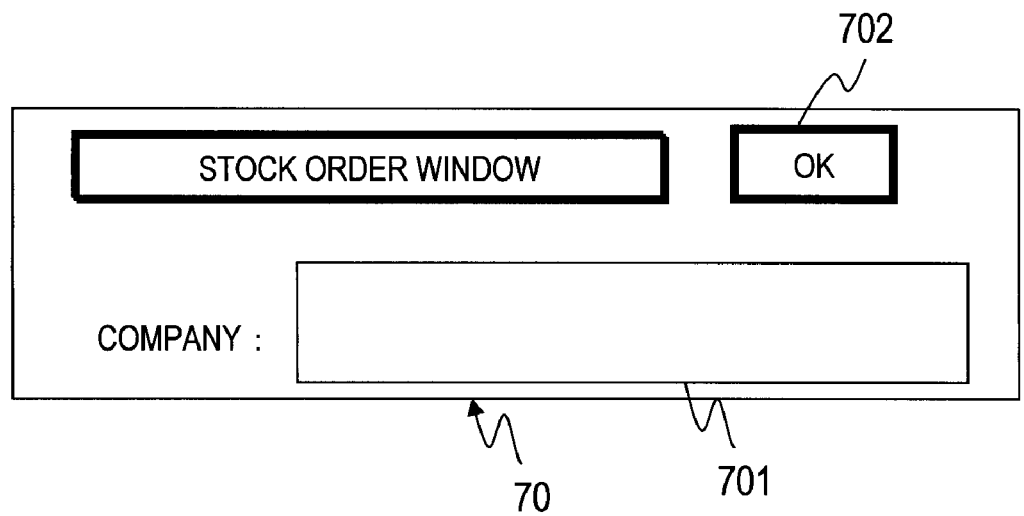
FIG. 7 is an explanatory diagram showing an input window displayed on the worker's operation personal computer in accordance with the embodiment of this invention.
Figure 8:
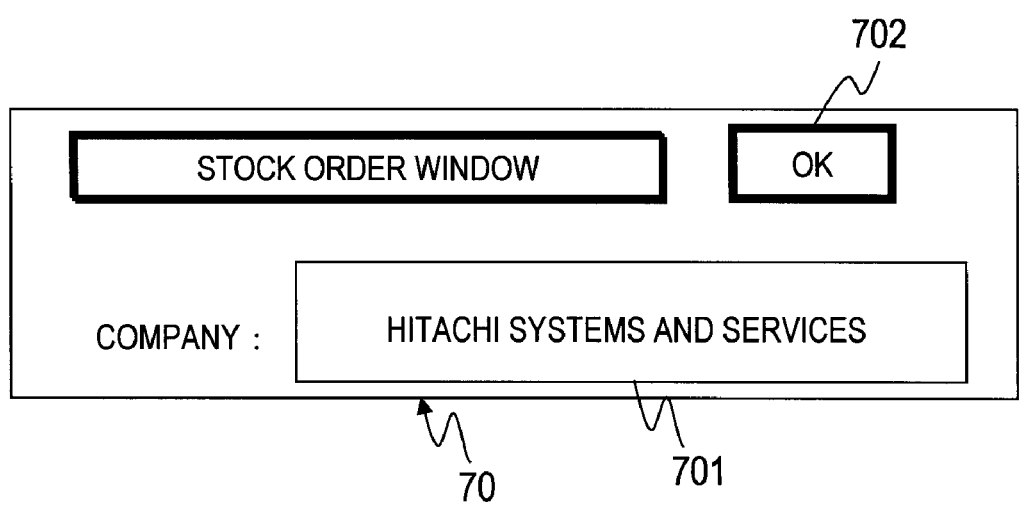
FIG. 8 is an explanatory diagram showing the input window 70 displayed on the worker's operation personal computer in accordance with the embodiment of this invention.

FIG. 7 and FIG. 8 are explanatory diagrams showing the input window 70 displayed on the worker's operation personal computer 10 according to the embodiment of this invention.

The input window 70 is a window for receiving designation of a company to be ordered from the operator. It should be noted that FIG. 7 illustrates the input window 70 shown before the operator inputs a company name. On the other hand, FIG. 8 illustrates the input window 70 shown after the operator has inputted the company name.

To start with, the worker's operation personal computer 10 displays an input window 70 illustrated in FIG. 7. It should be noted that the input window 70 contains a company name input box 701 and an input completion button 702.

The operator inputs the company name into the company name input box 701. With this input process, the input window 70 becomes as illustrated in FIG. 8. Then, the operator manipulates the input completion button 702.

When the input completion button 702 is manipulated, the worker's operation personal computer 10 calculates a period of time, as the operation time, till the input completion button 702 is manipulated since the input into the company name input box 701 has been started. Alternatively, the worker's operation personal computer 10 calculates a period of time, as the operation time, till the input completion button 702 is manipulated since the last character has been inputted into the company name input box 701.

Next, the worker's operation personal computer 10 selects, from the risk criterion management table 150, a record in which the identifier of the displayed input window 70 is coincident with the window title 1501 in the risk criterion management table 150. Next, the worker's operation personal computer 10 extracts the dangerous level threshold value 1503 and the caution level threshold value 1504 from the selected record.

Subsequently, the worker's operation personal computer 10 judges whether or not the calculated operation time is equal to or smaller than the extracted dangerous level threshold value 1503. If the operation time is equal to or smaller than the dangerous level threshold value 1503, the worker's operation personal computer 10 categorizes the operation on the input window 70 as the dangerous level. Then, the worker's operation personal computer 10 displays the alert window 80 shown in FIG. 9 indicating that the operation is at the dangerous level.

Further, the worker's operation personal computer 10 updates the operation time record table 60.

To be specific, the worker's operation personal computer 10 adds a new record to the operation time record table 60. Next, the worker's operation personal computer 10 stores a date on which the input into the company name input box 701 was started in the field "date 601" of the new record. Subsequently, the worker's operation personal computer 10 stores the time at which the input into the company name input box 701 was started in the field "time 602" of the new record. Next, the worker's operation personal computer 10 stores the identifier of the input window 70 in the field "window title 603" of the new record. Then, the worker's operation personal computer 10 stores the calculated operation time in the field "operation time 604" of the new record. Further, the worker's operation personal computer 10 stores the "dangerous level" in the field "criterion level 605" of the new record.

The worker's operation personal computer 10 thus updates the operation time record table 60.

On the other hand, if the operation time is greater than the dangerous level threshold value 1503, the worker's operation personal computer 10 judges whether or not the calculated operation time is equal to or smaller than the extracted caution level threshold value 1504. If the operation time is equal to or smaller than the extracted caution level threshold value 1504, the worker's operation personal computer 10 categorizes the operation on the input window 70 as the caution level. Then, the worker's operation personal computer 10 displays the alert window 81 shown in FIG. 10 indicating that the operation is at the caution level.

Further, the worker's operation personal computer 10 updates the operation time record table 60.

To be specific, the worker's operation personal computer 10 adds a new record to the operation time record table 60. Next, the worker's operation personal computer 10 stores a date on which the input into the company name input box 701 was started in the field "date 601" of the new record. Subsequently, the worker's operation personal computer 10 stores the time at which the input into the company name input box 701 was started in the field "time 602" of the new record. Next, the worker's operation personal computer 10 stores the identifier of the input window 70 in the field "window title 603" of the new record. Then, the worker's operation personal computer 10 stores the calculated operation time in the field "operation time 604" of the new record. Further, the worker's operation personal computer 10 stores the "caution level" in the field "criterion level 605" of the new record.

On the other hand, if the operation time is greater than the caution level threshold value 1504, the worker's operation personal computer 10 categorizes the operation with respect to the input window 70 into the standard level. The worker's operation personal computer 10 generates a confirm window 71 shown in FIG. 11. The worker's operation personal computer 10 displays the thus-generated confirm window 71.

Further, the worker's operation personal computer 10 updates the operation time record table 60.

To be specific, the worker's operation personal computer 10 adds a new record to the operation time record table 60. Next, the worker's operation personal computer 10 stores a date on which the input into the company name input box 701 was started in the field "date 601" of the new record. Subsequently, the worker's operation personal computer 10 stores the time at which the input into the company name input box 701 was started in the field "time 602" of the new record. Next, the worker's operation personal computer 10 stores the identifier of the input window 72 in the field "window title 603" of the new record. Then, the worker's operation personal computer 10 stores the calculated operation time in the field "operation time 604" of the new record. Further, the worker's operation personal computer 10 stores the "standard level" in the field "criterion level 605" of the new record.

Figure 9:
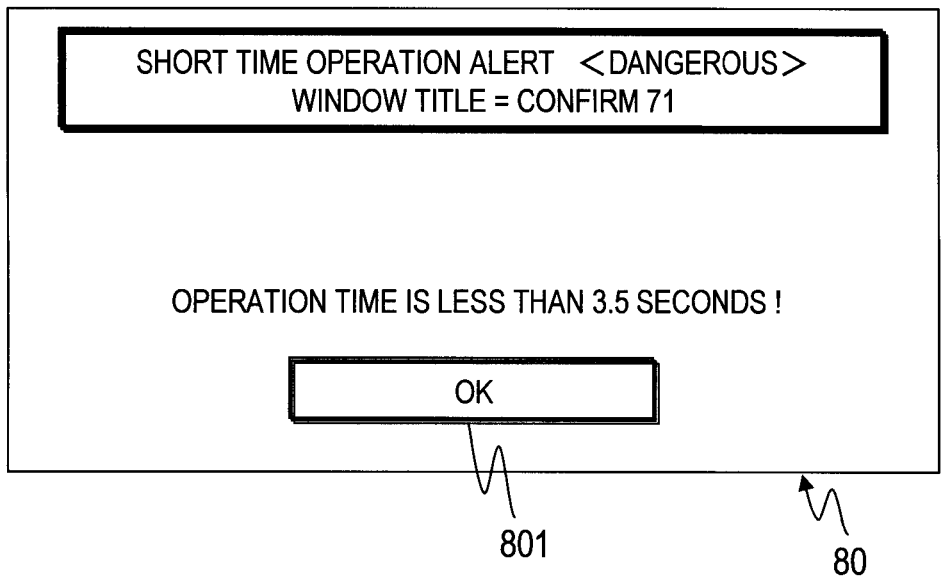
FIG. 9 is an explanatory diagram sowing an alert window displayed on the worker's operation personal computer in accordance with the embodiment of this invention.

FIG. 9 is an explanatory diagram showing an alert window 80 displayed on the worker's operation personal computer 10 according to the embodiment of this invention.

The alert window 80 shows that the operation conducted by the operator is at the dangerous level. The alert window 80 contains a confirm button 801. Further, the alert window 80 may also contain the calculated operation time and an identifier of the window on which the operation is performed.

The operator, when confirming a content of the alert window 80, manipulates the confirm button 801. The worker's operation personal computer 10 displays the window (input window or confirm window) to be displayed next. At this time, the worker's operation personal computer 10 calculates a period of time, as the operation time, till the confirm button 801 is manipulated since the alert window 80 has been displayed.

Next, the worker's operation personal computer 10 selects, from the risk criterion management table 150, a record in which the identifier of the displayed alert window 80 is coincident with the data in the window title 1501 in the risk criterion management table 150. Next, the worker's operation personal computer 10 extracts the dangerous level threshold value 1503 and the caution level threshold value 1504 from the selected record.

Subsequently, the worker's operation personal computer 10 categorizes, based on the calculated operation time, the extracted dangerous level threshold value 1503, and the extracted caution level threshold value 1504, the operation with respect to the alert window 80 as any one of the dangerous level, the caution level, and the standard level.

Further, the worker's operation personal computer 10 updates the operation time record table 60.

Specifically, the worker's operation personal computer 10 adds a new record to the operation time record table 60. Next, the worker's operation personal computer 10 stores a date on which the alert window 80 was displayed in the field "date 601" of the new record. Subsequently, the worker's operation personal computer 10 stores the time at which the alert window 80 was displayed in the field "time 602" of the new record. Next, the worker's operation personal computer 10 stores the identifier of the alert window 80 in the field "window title 603" of the new record. Then, the worker's operation personal computer 10 stores the calculated operation time in the field "operation time 604" of the new record. Further, the worker's operation personal computer 10 stores the level, into which the operation with respect to the alert window 80 has been categorized, in the field "criterion level 605" of the new record.

Figure 10:
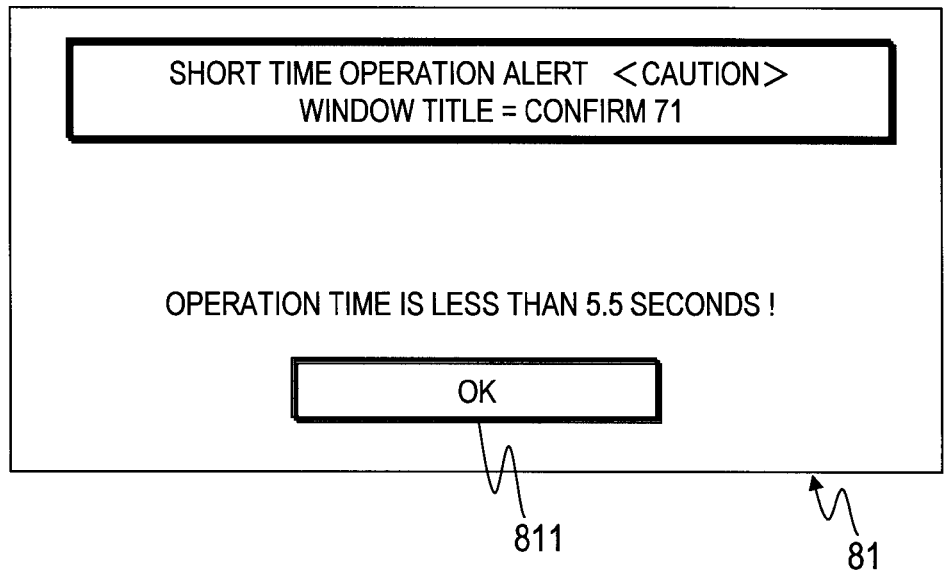
FIG. 10 is an explanatory diagram showing an alert window displayed on the worker's operation personal computer in accordance with the embodiment of this invention.

FIG. 10 is an explanatory diagram showing an alert window 81 displayed on the worker's operation personal computer 10 according to the embodiment of this invention.

The alert window 81 shows that the operation conducted by the operator is at the caution level. The alert window 80 contains a confirm button 811. Further, the alert window 81 may also contain the calculated operation time and an identifier of the window on which the operation is performed.

The operator, when confirming a content of the alert window 81, manipulates the confirm button 811. The worker's operation personal computer 10 displays the window (input window or confirm window) to be displayed next. At this time, the worker's operation personal computer 10 calculates a period of time, as the operation time, till the confirm button 811 is manipulated since the alert window 81 has been displayed.

Next, the worker's operation personal computer 10 selects, from the risk criterion management table 150, a record in which the identifier of the displayed alert window 81 is coincident with the data in the window title 1501 in the risk criterion management table 150. Next, the worker's operation personal computer 10 extracts the dangerous level threshold value 1503 and the caution level threshold value 1504 from the selected record.

Subsequently, the worker's operation personal computer 10 categorizes, based on the calculated operation time, the extracted dangerous level threshold value 1503, and the extracted caution level threshold value 1504, the operation with respect to the alert window 81 as any one of the dangerous level, the caution level, and the standard level.

Further, the worker's operation personal computer 10 updates the operation time record table 60.

Specifically, the worker's operation personal computer 10 adds a new record to the operation time record table 60. Next, the worker's operation personal computer 10 stores a date on which the alert window 81 was displayed in the field "date 601" of the new record. Subsequently, the worker's operation personal computer 10 stores the time at which the alert window 81 was displayed in the field "time 602" of the new record. Next, the worker's operation personal computer 10 stores the identifier of the alert window 81 in the field "window title 603" of the new record. Then, the worker's operation personal computer 10 stores the calculated operation time in the field "operation time 604" of the new record. Further, the worker's operation personal computer 10 stores the level, into which the operation with respect to the alert window 81 has been categorized, in the field "criterion level 605" of the new record.

Figure 11:
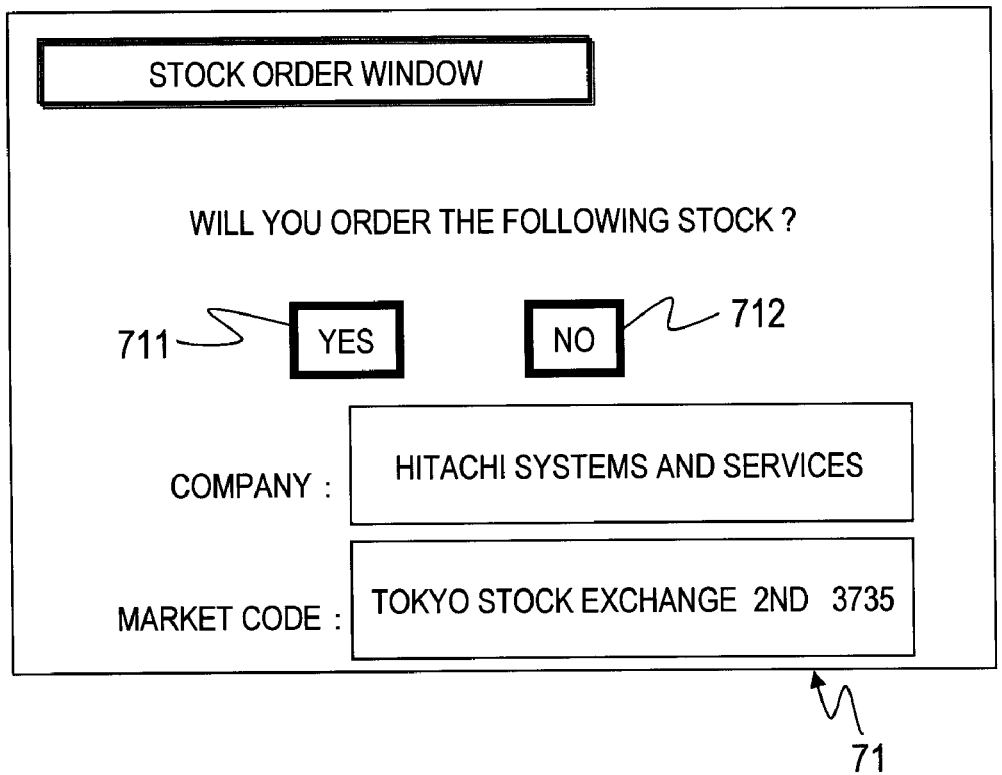
FIG. 11 is an explanatory diagram showing a confirm window displayed on the worker's operation personal computer in accordance with the embodiment of this invention.

FIG. 11 is an explanatory diagram showing the confirm window 71 displayed on the worker's operation personal computer 10 according to the embodiment of this invention.

The confirm window 71 is a window used for the operator to confirm the company name inputted into a company name input box 701 on the input window 70. The confirm window 71 contains the company name inputted into the company name input box 701 of the input window 70, a confirm button 711, and a cancel button 712. The confirm window 71 may further contain information on the company. For example, the information on the company contains a name of stock market on which the company is listed, and a company code of the company.

The operator, when judging that the company name contained in the confirm window 71 is valid, manipulates the confirm button 711. On the other hand, the operator, when judging that the company name contained in the confirm window 71 is invalid, manipulates the cancel button 712. When the cancel button 712 is manipulated, the worker's operation personal computer 10 displays the input window 70 shown in FIG. 7.

On the other hand, when the confirm button 711 is manipulated, the worker's operation personal computer 10 calculates a length of time, as the operation time, till the confirm button 711 is manipulated since the confirm window 71 has been displayed.

Next, the worker's operation personal computer 10 selects, from the risk criterion management table 150, a record in which the identifier of the displayed confirm window 71 is coincident with the window title 1501 in the risk criterion management table 150. Next, the worker's operation personal computer 10 extracts the dangerous level threshold value 1503 and the caution level threshold value 1504 from the selected record.

Next, the worker's operation personal computer 10 judges whether or not the calculated operation time is equal to or smaller than the extracted dangerous level threshold value 1503. If the operation time is equal to or smaller than the dangerous level threshold value 1503, the worker's operation personal computer 10 categorizes the operation on the confirm window 71 as the dangerous level. The worker's operation personal computer 10 displays the alert window 80 shown in FIG. 9 indicating that the operation is at the dangerous level.

Further, the worker's operation personal computer 10 updates the operation time record table 60.

Specifically, the worker's operation personal computer 10 adds a new record to the operation time record table 60. Next, the worker's operation personal computer 10 stores a date on which the confirm window 71 was displayed in the field "date 601" of the new record. Subsequently, the worker's operation personal computer 10 stores the time at which the confirm window 71 was displayed in the field "time 602" of the new record. Next, the worker's operation personal computer 10 stores the identifier of the confirm window 71 in the field "window title 603" of the new record. Subsequently, the worker's operation personal computer 10 stores the calculated operation time in the field "operation time 604" of the new record. Further, the worker's operation personal computer 10 stores the "dangerous level" in the field "criterion level 605" of the new record.

The worker's operation personal computer 10 thus updates the operation time record table 60.

On the other hand, if the operation time is greater than the dangerous level threshold value 1503, the worker's operation personal computer 10 judges whether or not the calculated operation time is equal to or smaller than the extracted caution level threshold value 1504. If the operation time is equal to or smaller than the extracted caution level threshold value 1504, the worker's operation personal computer 10 categorizes the operation on the confirm window 71 as the caution level. Then, the worker's operation personal computer 10 displays the alert window 81 shown in FIG. 10 indicating that the operation is at the caution level.

Further, the worker's operation personal computer 10 updates the operation time record table 60.

Specifically, the worker's operation personal computer 10 adds a new record to the operation time record table 60. Next, the worker's operation personal computer 10 stores a date on which the confirm window 71 was displayed in the field "date 601" of the new record. Subsequently, the worker's operation personal computer 10 stores the time at which the confirm window 71 was displayed in the field "time 602" of the new record. Next, the worker's operation personal computer 10 stores the identifier of the confirm window 71 in the field "window title 603" of the new record. Subsequently, the worker's operation personal computer 10 stores the calculated operation time in the field "operation time 604" of the new record. Further, the worker's operation personal computer 10 stores the "caution level" in the field "criterion level 605" of the new record.

If the operation time is greater than the caution level threshold value 1504, the worker's operation personal computer 10 categorizes the operation on the confirm window 71 as the standard level. The worker's operation personal computer 10 generates the input window 72 shown in FIG. 12. Then the worker's operation personal computer 10 displays the generated input window 72.

Further, the worker's operation personal computer 10 updates the operation time record table 60.

Specifically, the worker's operation personal computer 10 adds a new record to the operation time record table 60. Next, the worker's operation personal computer 10 stores a date on which the confirm window 71 was displayed in the field "date 601" of the new record. Subsequently, the worker's operation personal computer 10 stores the time at which the confirm window 71 was displayed in the field "time 602" of the new record. Next, the worker's operation personal computer 10 stores the identifier of the confirm window 71 in the field "window title 603" of the new record. Subsequently, the worker's operation personal computer 10 stores the calculated operation time in the field "operation time 604" of the new record. Further, the worker's operation personal computer 10 stores the "standard level" in the field "criterion level 605" of the new record.

Figure 12:
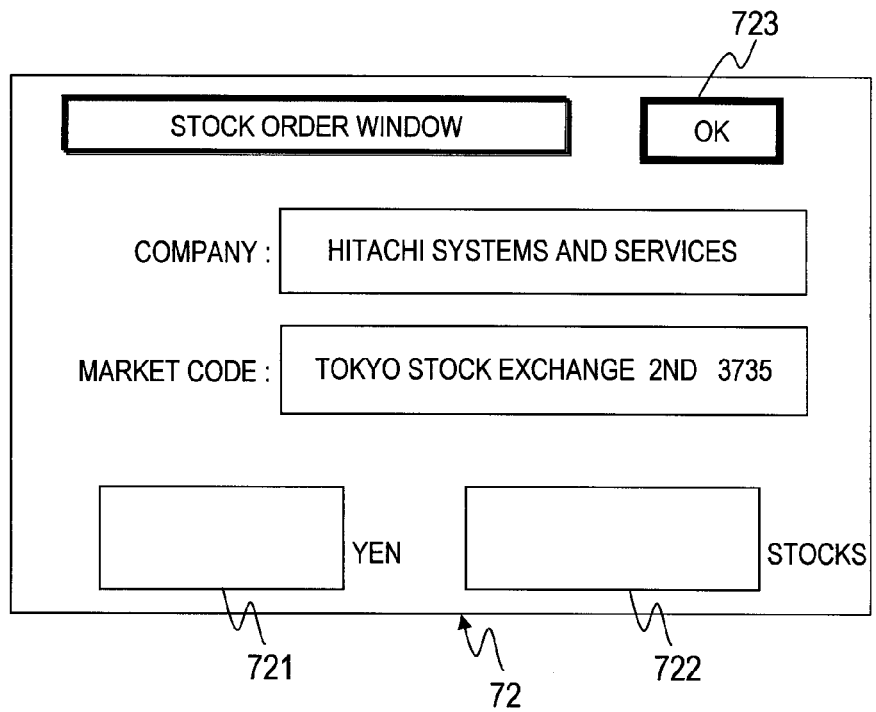
FIG. 12 is an explanatory diagram showing the input window displayed on the worker's operation personal computer in accordance with the embodiment of this invention.
Figure 13:
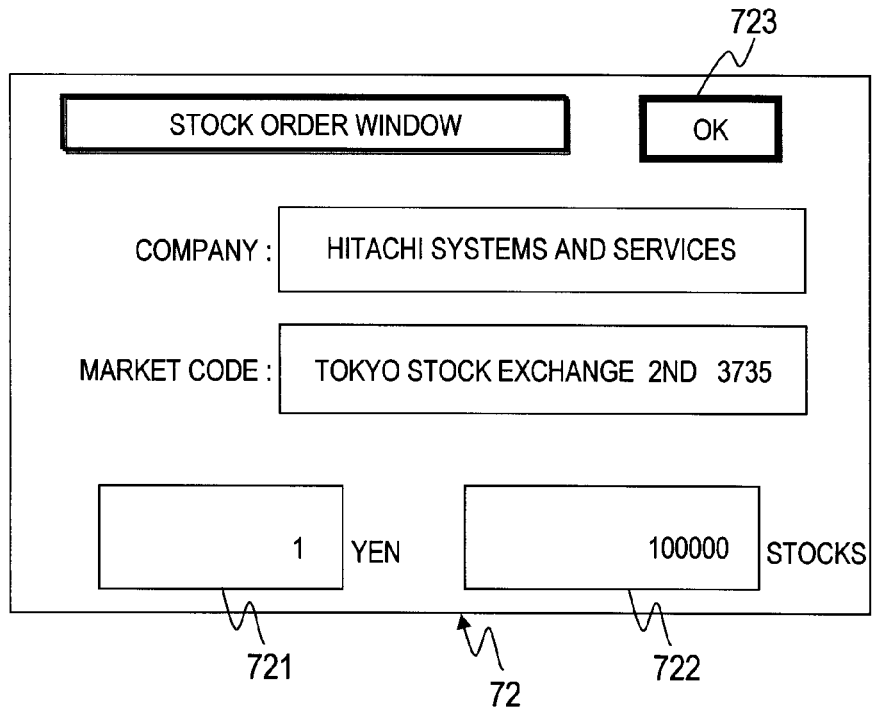
FIG. 13 is an explanatory diagram showing the input window displayed on the worker's operation personal computer in accordance with the embodiment of this invention.

FIG. 12 and FIG. 13 are explanatory diagrams showing the input window 72 displayed on the worker's operation personal computer 10 according to the embodiment of this invention.

The input window 72 is a window for receiving, from the operator, designation of an order price and designation of the number of order stocks. FIG. 12 illustrates the input window 72 shown before the operator inputs the order price and the number of order stocks. On the other hand, FIG. 13 illustrates the input window 72 shown after the operator has inputted the order price and the number of order stocks.

The input window 72 contains an order price input box 721, an order stock count input box 722, and an input completion button 723. The input window 72 may further contain information about the company name inputted into the company name input box 701 on the input window 70.

The operator inputs the order price into the order price input box 721 and inputs the number of order stocks into the order stock count input box 722. With this input process, the input window 72 becomes as illustrated in FIG. 13. Then, the operator manipulates the input completion button 723.

When the input completion button 723 is manipulated, the worker's operation personal computer 10 calculates a period of time, as the operation time, till the input completion button 723 is manipulated since the input into one of the order price input box 721 and the order stock count input box 722 has been started. Alternatively, the worker's operation personal computer 10 calculates a period of time, as the operation time, till the input completion button 723 is manipulated since the last character has been inputted into one of the order price input box 721 and the order stock count input box 722. Alternatively, the worker's operation personal computer 10 calculates a period of time, as the operation time, till the input completion button 723 is manipulated since the input window 72 has been displayed.

Next, the worker's operation personal computer 10 selects, from the risk criterion management table 150, a record in which the identifier of the displayed input window 72 is coincident with the window title 1501 in the risk criterion management table 150. Next, the worker's operation personal computer 10 extracts the dangerous level threshold value 1503 and the caution level threshold value 1504 from the selected record.

Subsequently, the worker's operation personal computer 10 judges whether or not the calculated operation time is equal to or smaller than the extracted dangerous level threshold value 1503. If the operation time is equal to or smaller than the dangerous level threshold value 1503, the worker's operation personal computer 10 categorizes the operation on the input window 72 as the dangerous level. The worker's operation personal computer 10 displays the alert window 80 shown in FIG. 9 indicating that the operation is at the dangerous level.

Further, the worker's operation personal computer 10 updates the operation time record table 60.

To be specific, the worker's operation personal computer 10 adds a new record to the operation time record table 60. Next, the worker's operation personal computer 10 stores a date on which the input into one of the order price input box 721 and the order stock count input box 722 was started in the field "date 601" of the new record. Subsequently, the worker's operation personal computer 10 stores the time at which the input into one of the order price input box 721 and the order stock count input box 722 was started in the field "time 602" of the new record. Next, the worker's operation personal computer 10 stores the identifier of the input window 72 in the field "window title 603" of the new record. Then, the worker's operation personal computer 10 stores the calculated operation time in the field "operation time 604" of the new record. Further, the worker's operation personal computer 10 stores the "dangerous level" in the field "criterion level 605" of the new record.

The worker's operation personal computer 10 thus updates the operation time record table 60.

On the other hand, if the operation time is greater than the dangerous level threshold value 1503, the worker's operation personal computer 10 judges whether or not the calculated operation time is equal to or smaller than the extracted caution level threshold value 1504. If the operation time is equal to or smaller than the extracted caution level threshold value 1504, the worker's operation personal computer 10 categorizes the operation on the confirm window 72 as the caution level. Then, the worker's operation personal computer 10 displays the alert window 81 shown in FIG. 10 indicating that the operation is at the caution level.

Further, the worker's operation personal computer 10 updates the operation time record table 60.

To be specific, the worker's operation personal computer 10 adds a new record to the operation time record table 60. Next, the worker's operation personal computer 10 stores a date on which the input into one of the order price input box 721 and the order stock count input box 722 was started in the field "date 601" of the new record. Subsequently, the worker's operation personal computer 10 stores the time at which the input into one of the order price input box 721 and the order stock count input box 722 was started in the field "time 602" of the new record. Next, the worker's operation personal computer 10 stores the identifier of the input window 72 in the field "window title 603" of the new record. Then, the worker's operation personal computer 10 stores the calculated operation time in the field "operation time 604" of the new record. Further, the worker's operation personal computer 10 stores the "caution level" in the field "criterion level 605" of the new record.

If the operation time is greater than the caution level threshold value 1504, the worker's operation personal computer 10 categorizes the operation on the confirm window 72 as the standard level. The worker's operation personal computer 10 generates the input window 73 shown in FIG. 14. Then the worker's operation personal computer 10 displays the generated input window 73.

Further, the worker's operation personal computer 10 updates the operation time record table 60.

To be specific, the worker's operation personal computer 10 adds a new record to the operation time record table 60. Next, the worker's operation personal computer 10 stores a date on which the input into one of the order price input box 721 and the order stock count input box 722 was started in the field "date 601" of the new record. Subsequently, the worker's operation personal computer 10 stores the time at which the input into one of the order price input box 721 and the order stock count input box 722 was started in the field "time 602" of the new record. Next, the worker's operation personal computer 10 stores the identifier of the input window 70 in the field "window title 603" of the new record. Then, the worker's operation personal computer 10 stores the calculated operation time in the field "operation time 604" of the new record. Further, the worker's operation personal computer 10 stores the "standard level" in the field "criterion level 605" of the new record.

Figure 14:
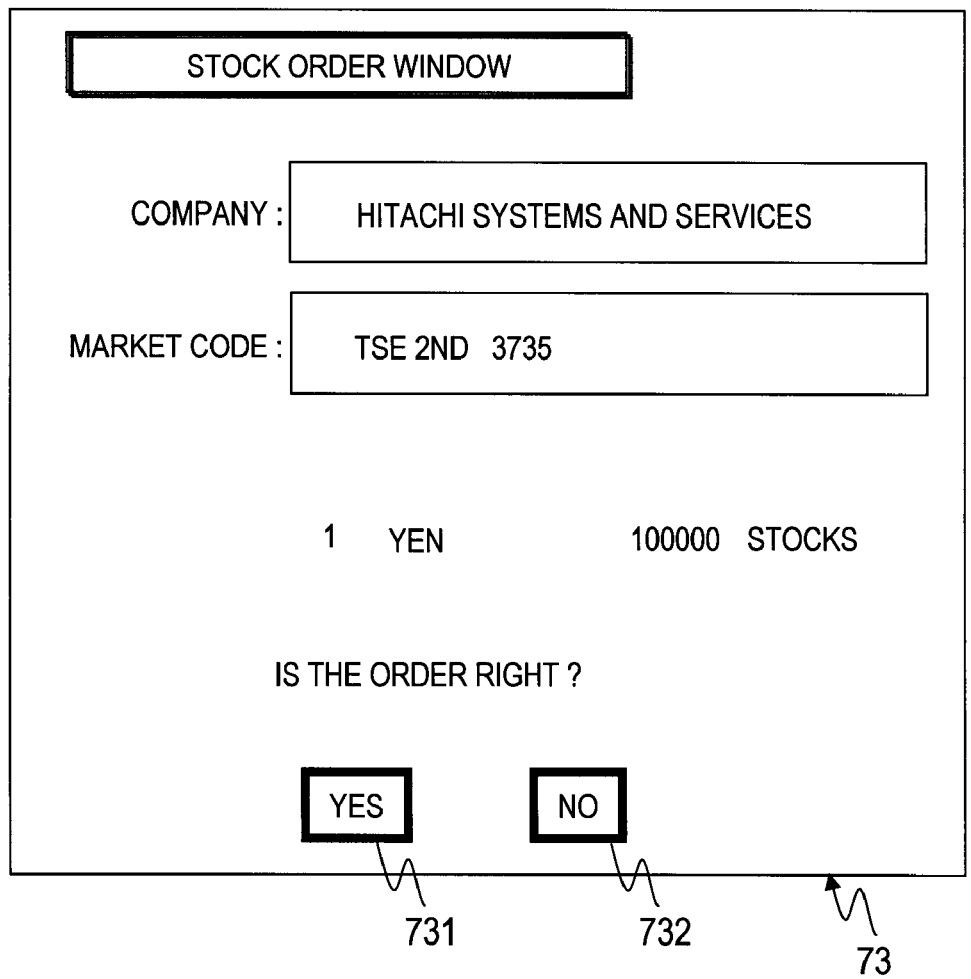
FIG. 14 is an explanatory diagram of the confirm window displayed on the worker's operation personal computer in accordance with the embodiment of this invention.

FIG. 14 is an explanatory diagram showing the confirm window 73 displayed on the worker's operation personal computer 10 according to the embodiment of this invention.

The confirm window 73 is a window used for the operator to confirm the content of the order. The content of the order contains the company name inputted into the company name input box 701 on the input window 70, the order price inputted into the order price input box 721 on the input window 72, and the number of order stocks inputted into the order stock count input box 722 on the input window 72.

The confirm window 73 contains the content of the order, a confirm button 731, and a cancel button 732. The confirm window 73 may further contain information on the company. For example, the information on the company contains a name of stock market on which the company is listed, and a company code of the company.

The operator, when judging that the content of the order contained in the confirm window 73 is valid, manipulates the confirm button 731. On the other hand, the operator, when judging that the content of the order contained in the confirm window 73 is invalid, manipulates the cancel button 732. When the cancel button 732 is manipulated, the worker's operation personal computer 10 displays one of the input window 70 shown in FIG. 7 and the input window 72 shown in FIG. 12.

On the other hand, when the confirm button 731 is manipulated, the worker's operation personal computer 10 calculates a length of time, as the operation time, till the confirm button 731 is manipulated since the confirm window 73 has been displayed.

Next, the worker's operation personal computer 10 selects, from the risk criterion management table 150, a record in which the identifier of the displayed confirm window 73 is coincident with the window title 1501 in the risk criterion management table 150. Next, the worker's operation personal computer 10 extracts the dangerous level threshold value 1503 and the caution level threshold value 1504 from the selected record.

Next, the worker's operation personal computer 10 judges whether or not the calculated operation time is equal to or smaller than the extracted dangerous level threshold value 1503. If the operation time is equal to or smaller than the dangerous level threshold value 1503, the worker's operation personal computer 10 categorizes the operation on the confirm window 73 as the dangerous level. Then, the worker's operation personal computer 10 displays the alert window 80 shown in FIG. 9 indicating that the operation is at the dangerous level. At this time, the worker's operation personal computer 10 may or may not receive the order with the content inputted from the operator.

Further, the worker's operation personal computer 10 updates the operation time record table 60.

Specifically, the worker's operation personal computer 10 adds a new record to the operation time record table 60. Next, the worker's operation personal computer 10 stores a date on which the confirm window 73 was displayed in the field "date 601" of the new record. Subsequently, the worker's operation personal computer 10 stores the time at which the confirm window 73 was displayed in the field "time 602" of the new record. Next, the worker's operation personal computer 10 stores the identifier of the confirm window 73 in the field "window title 603" of the new record. Subsequently, the worker's operation personal computer 10 stores the calculated operation time in the field "operation time 604" of the new record. Further, the worker's operation personal computer 10 stores the "dangerous level" in the field "criterion level 605" of the new record.

The worker's operation personal computer 10 thus updates the operation time record table 60.

If the operation time is greater than the dangerous level threshold value 1503, the worker's operation personal computer 10 judges whether or not the calculated operation time is equal to or smaller than the extracted caution level threshold value 1504. If the operation time is equal to or smaller than the extracted caution level threshold value 1504, the worker's operation personal computer 10 categorizes the operation with respect to the confirm window 73 as the caution level. Then, the worker's operation personal computer 10 displays the alert window 81 shown in FIG. 10 indicating that the operation is at the caution level. At this time, the worker's operation personal computer 10 may or may not receive the order with the content inputted from the operator.

Further, the worker's operation personal computer 10 updates the operation time record table 60.

Specifically, the worker's operation personal computer 10 adds a new record to the operation time record table 60. Next, the worker's operation personal computer 10 stores a date on which the confirm window 73 was displayed in the field "date 601" of the new record. Subsequently, the worker's operation personal computer 10 stores the time at which the confirm window 73 was displayed in the field "time 602" of the new record. Next, the worker's operation personal computer 10 stores the identifier of the confirm window 73 in the field "window title 603" of the new record. Subsequently, the worker's operation personal computer 10 stores the calculated operation time in the field "operation time 604" of the new record. Further, the worker's operation personal computer 10 stores the "caution level" in the field "criterion level 605" of the new record.

On the other hand, if the operation time is larger than the caution level threshold value 1504, the worker's operation personal computer 10 categorizes the operation with respect to the confirm window 73 as the standard level. Then, the worker's operation personal computer 10 receives the order with the content inputted from the operator.

Further, the worker's operation personal computer 10 updates the operation time record table 60.

Specifically, the worker's operation personal computer 10 adds a new record to the operation time record table 60. Next, the worker's operation personal computer 10 stores a date on which the confirm window 73 was displayed in the field "date 601" of the new record. Subsequently, the worker's operation personal computer 10 stores the time at which the confirm window 73 was displayed in the field "time 602" of the new record. Next, the worker's operation personal computer 10 stores the identifier of the confirm window 73 in the field "window title 603" of the new record. Subsequently, the worker's operation personal computer 10 stores the calculated operation time in the field "operation time 604" of the new record. Further, the worker's operation personal computer 10 stores the "standard level" in the field "criterion level 605" of the new record.

The order of the certificate is thus terminated.

According to this embodiment, the worker's operation personal computer 10 calculates the operation time, however, the summary server 100 may also calculate the operation time on the basis of the operation record of the worker's operation personal computer 10.

Moreover, in this embodiment, the worker's operation personal computer 10 categorizes the operation on the window into any one of the dangerous level, the caution level, and the standard level. However, the summary server 100 may also categorize the operation on the window into any one of the dangerous level, the caution level, and the standard level.

Figure 15:
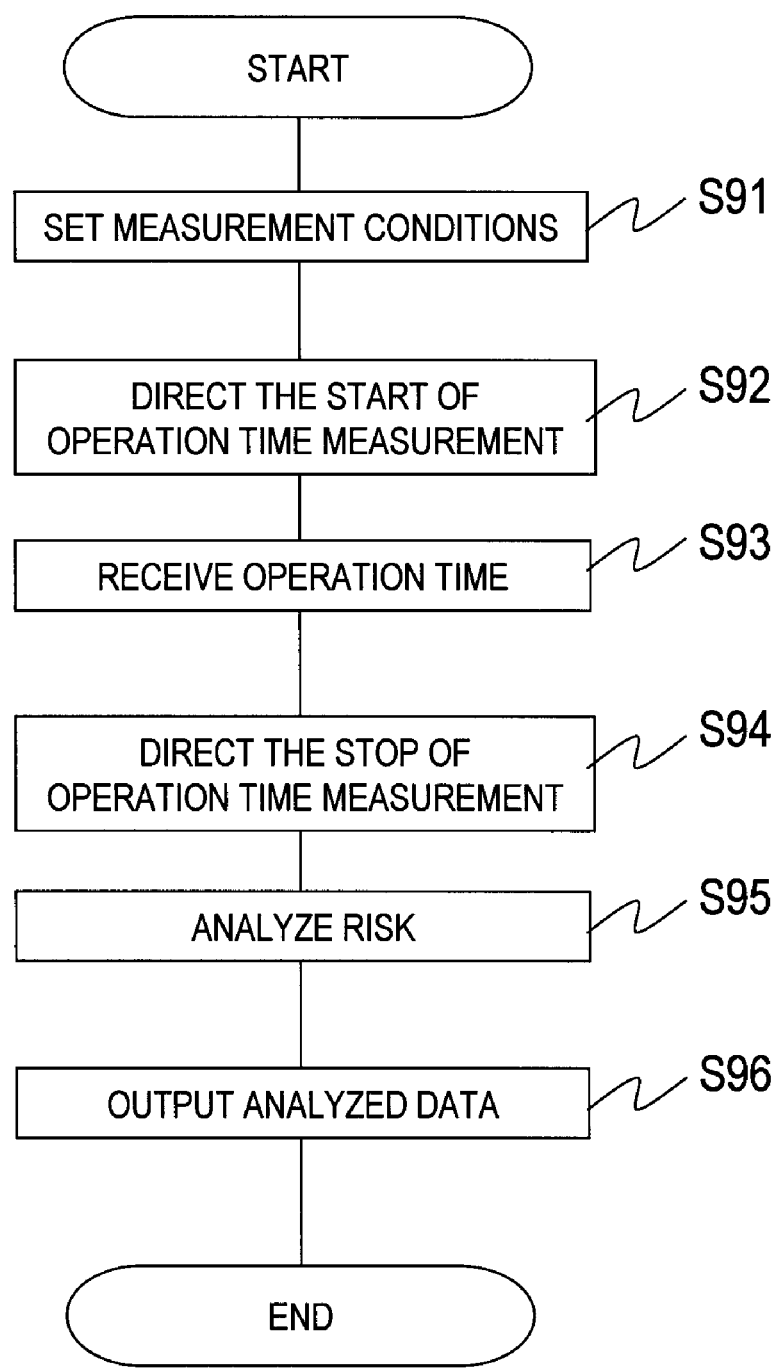
FIG. 15 is a flowchart showing a summarizing process executed by the summary server 100 in accordance with the embodiment of this invention.

FIG. 15 is a flowchart showing a summarizing process executed by the summary server 100 according to the embodiment of this invention.

To begin with, the summary server 100 executes a measurement condition setting process (S91). It should be noted that the measurement condition setting process will be explained in detail with reference to FIG. 16.

Thereafter, with an elapse of the starting date/time 1401 in the measurement time-span management table 140, the summary server 100 directs the measurement target worker's operation personal computer 10 to start the operation time measurement (S92). At this time, the summary server 100 transmits the risk criterion management table 150 generated in Step S91 to the measurement target worker's operation personal computer 10. It should be noted that the measurement target worker's operation personal computer 10 is the worker's operation personal computer 10 set as the measurement target PC, which is used by the operator.

Thereupon, the worker's operation personal computer 10 starts the operation time measurement. Then, the worker's operation personal computer 10 stores the measured operation time in the operation time record table 60. It should be noted that the worker's operation personal computer 10 periodically transmits the operation time record table 60 to the summary server 100.

The summary server 100 receives the operation time record table 60 from the worker's operation personal computer 10 (S93). Then, the summary server 100 updates, based on the received operation time record table 60, the operation time record gathering table 130.

Specifically, the summary server 100 stores the date 601 of the received operation time record table 60 in the field "date 1301" of the operation time record gathering table 130. Next, the summary server 100 stores the time 602 of the received operation time record table 60 in the field "time 1302" of the operation time record gathering table 130. Subsequently, the summary server 100 stores the window title 603 of the received operation time record table 60 in the field "window title 1303" of the operation time record gathering table 130. Next, the summary server 100 stores the operation time 604 of the received operation time record table 60 in the field "operation time 1304" of the operation time record gathering table 130. Subsequently, the summary server 100 stores the criterion level 605 of the received operation time record table 60 in the field "criterion level 1305" of the operation time record gathering table 130.

Next, the summary server 100 specifies the operator of the worker's operation personal computer 10 defined as a sender of the received operation time record table 60. Then, the summary server 100 stores the identifier of the specified operator in the field "operator name 1306" of the operation time record gathering table 130. Next, the summary server 100 stores the identifier of the department, to which the specified operator belongs, in the field "department 1307" of the operation time record gathering table 130. Further, the summary server 100 stores the identifier of the section, to which the specified operator belongs, in the field "section 1308" of the operation time record gathering table 130.

Moreover, the summary server 100 may rearrange the records contained in the operation time record gathering table 130 in the sequence of the date 1301 and the time 1302.

Thereafter, with an elapse of the ending date/time 1402 in the measurement time-span management table 140, the summary server 100 directs the measurement target worker's operation personal computer 10 to stop the operation time measurement (S94). Thereupon, the worker's operation personal computer 10 stops the operation time measurement.

Next, the summary server 100 executes the risk analyzing process. It should be noted that an in-depth description of the risk analyzing process will be made with reference to FIG. 18.

The summary server 100 transmits a result of the risk analysis to the manager's terminal 200 (S96). The result of the risk analysis contains the number of the operations categorized as the dangerous levels, the number of the operations categorized as the caution levels, and the number of the operations categorized as the standard levels.

The manager's terminal 200 receives the result of the risk analysis from the summary server 100. Then, the manager's terminal 200 displays the received result of the risk analysis. For example, the manager's terminal 200 displays, as the result of the risk analysis, one of the risk analyzed data result window illustrated in FIG. 19 and the risk analyzed data result window illustrated in FIG. 20.

Then, the summary server 100 terminates the summarizing process.

Figure 16:
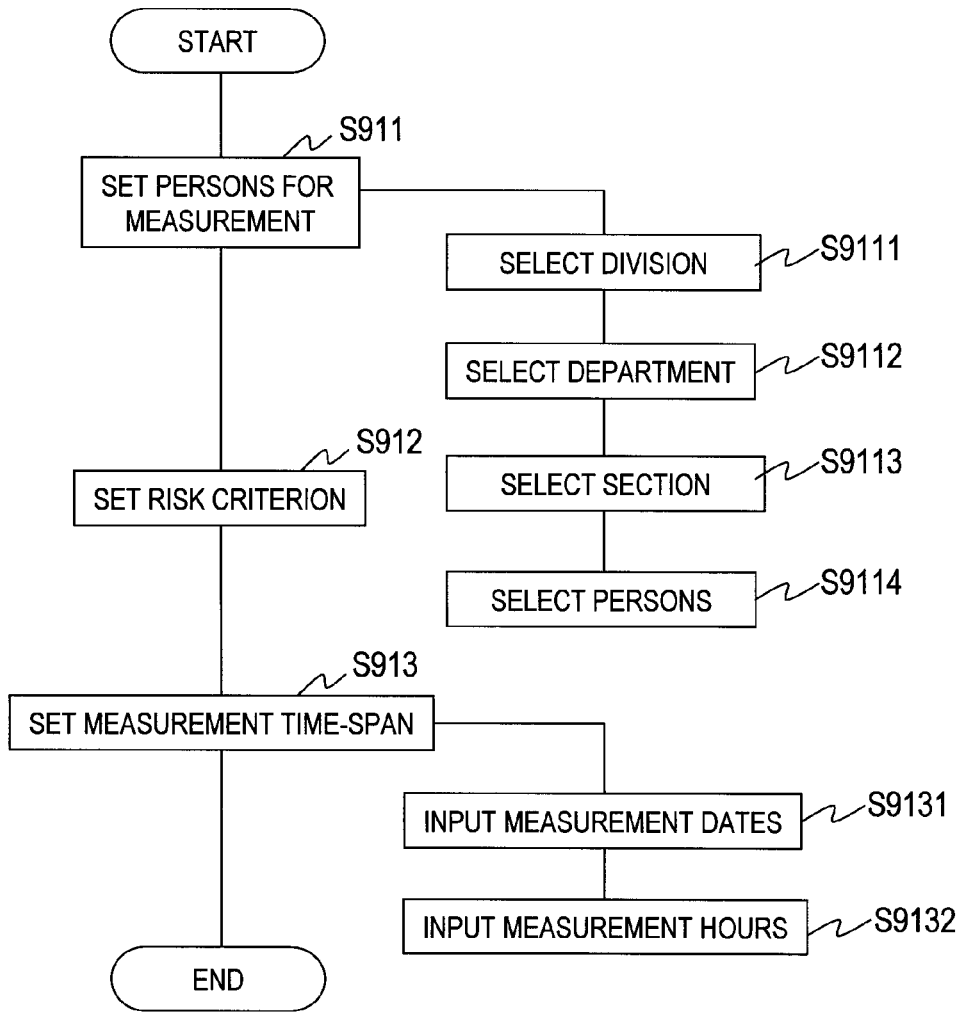
FIG. 16 is a flowchart showing the measuring condition setting process executed by the summary server in accordance with the embodiment of this invention.

FIG. 16 is a flowchart showing the measuring condition setting process executed by the summary server 100 according to the embodiment of this invention.

The measuring condition setting process is executed in Step S91 of the summarizing process shown in FIG. 15.

First, the summary server 100 sets person (operator) for measurement (S911).

Figure 17:
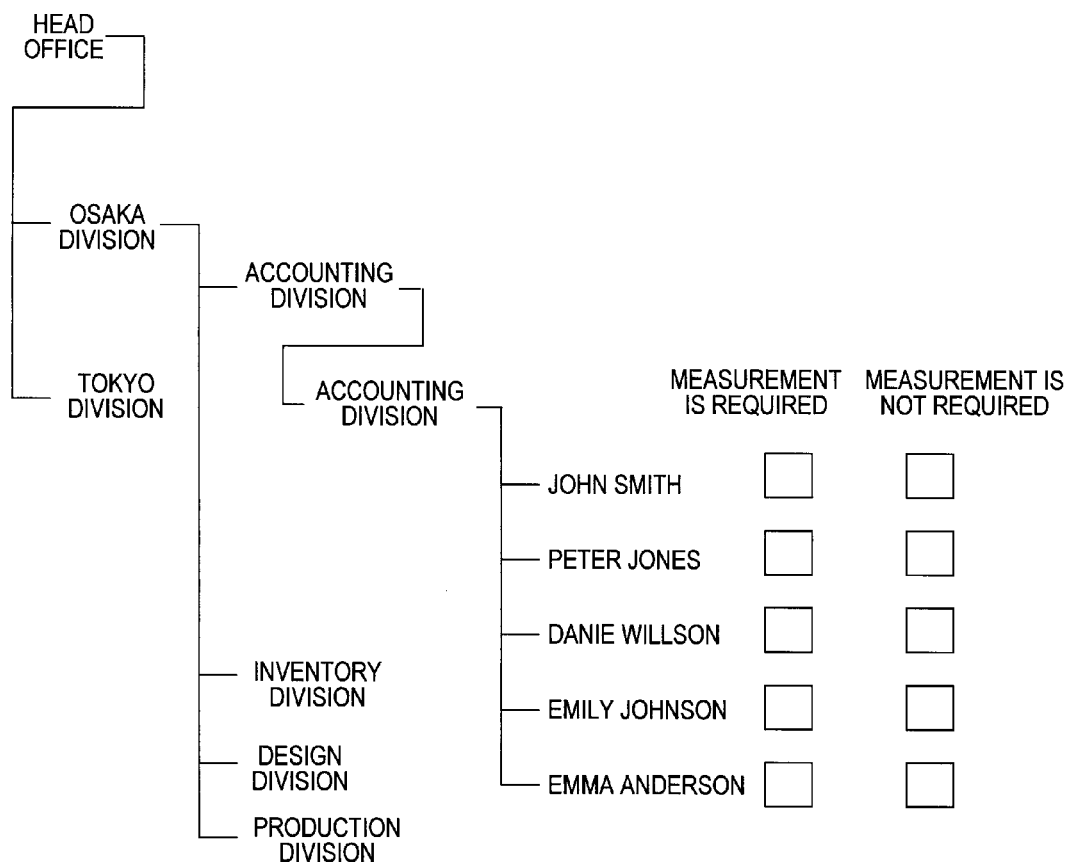
FIG. 17 is an explanatory diagram showing the operator selecting window displayed on the manager's terminal in accordance with the embodiment of this invention.

To be specific, the summary server 100 instructs the manager's terminal 200 to display the operator selecting window shown in FIG. 17. Then, the manager's terminal 200 displays the operator selecting window.

FIG. 17 is an explanatory diagram showing the operator selecting window displayed on the manager's terminal 200 according to the embodiment of this invention.

The operator selecting window is a window that prompts the manager to select the measurement target operator.

On the operator selecting window displayed on the manager's terminal 200, the manager selects a measurement target division (S9111). Then, the manager's terminal 200 displays a name of the department that belongs to the selected division. Next, the manager selects the measurement target department (S9112). Thereupon, the manager's terminal 200 displays a name of the section belonging to the selected department. Next, the manager selects the measurement target section (S9113). Then, the manager's terminal 200 displays a name of the operator (person) who belongs to the selected section. Subsequently, the manager selects the measurement target operator.

Then, the manager's terminal 200 notifies the summary server 100 of the selected operator. The summary server 100 sets the notified operator as the measurement target operator.

Next, the summary server 100 sets the risk criterion (S912).

To be specific, the manager inputs the standard time set per window and displayed on the worker's operation personal computer 10 to the manager's terminal 200. Thereupon, the manager's terminal 200 transmits the inputted standard time to the summary server 100.

The summary server 100 receives the standard time from the manager's terminal 200. Subsequently, the summary server 100 stores the received standard time in the field "standard time 1505" of the risk criterion management table 150. Next, the summary server 100 stores the time, obtained by subtracting 4 seconds from the received standard time, in the field "dangerous level threshold value 1503" of the risk criterion management table 150. Moreover, the summary server 100 stores the time, obtained by subtracting 2 seconds from the received standard time, in the field "caution level threshold value 1504" of the risk criterion management table 150.

It should be noted that the manager may input, in addition to the standard time, the dangerous level threshold value and the caution level threshold value to the manager's terminal 200. In this case, the summary server 100 stores the inputted dangerous level threshold value in the field "dangerous level threshold value 1503" of the risk criterion management table 150. Further, the summary server 100 stores the inputted caution level threshold value in the field "caution level threshold value 1504" of the risk criterion management table 150.

The summary server 100 updates the risk criterion management table 150 in the manner described above, thereby completing the setting of the risk criteria.

Next, the summary server 100 sets measurement target time (hours) (S9132).

Specifically, the manager inputs a measurement starting date/time and a measurement ending date/time to the manager's terminal 200 (S9131 and S9132). Then, the manager's terminal 200 sends the inputted measurement starting date/time and the inputted measurement ending date/time to the summary server 100.

The summary server 100 receives the measurement starting date/time and the measurement ending date/time from the manager's terminal 200. Next, the summary server 100 stores the received measurement starting date/time in the starting date/time 1401 of the measurement time-span management table 140. Subsequently, the summary server 100 stores the received measurement ending date/time in the ending date/time 1402 of the measurement time-span management table 140.

As described above, the summary server 100 updates the measurement time-span management table 140, thereby completing the setting of the measurement target time-span (period).

Then, the summary server 100 terminates the measurement condition setting process.

Figure 18:
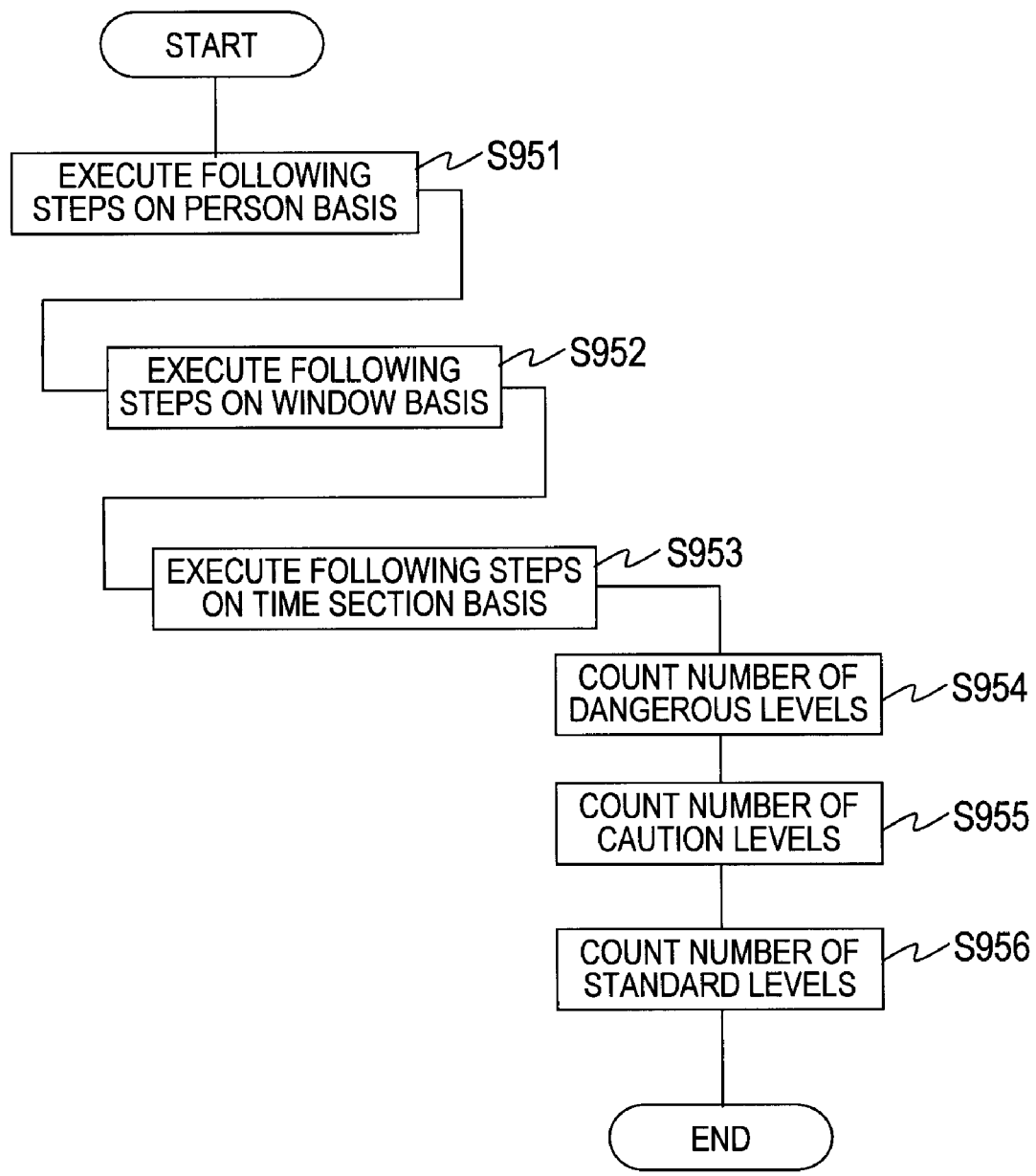
FIG. 18 is a flowchart showing the risk analyzing process executed by the summary server in accordance with the embodiment of this invention.

FIG. 18 is a flowchart showing the risk analyzing process executed by the summary server 100 according to the embodiment of this invention.

The risk analyzing process is executed in Step S95 of the summarizing process shown in FIG. 15.

To begin with, the summary server 100 sequentially selects one by one all the persons (operators) set for measurement (S951). Then, the summary server 100 executes Steps S952 to S956 for every selected operator.

Next, the summary server 100 sequentially selects one by one all the windows displayed on the worker's operation personal computer 10 (S952). Then, the summary server 100 executes Steps S953 to S956 for every selected window.

Subsequently, the summary server 100 sequentially selects one by one all the time-spans contained in the measurement target period (S953). The time-span to be selected is a length of time, e.g., one hour, serving as the unit on which the risk is analyzed.

Next, the summary server 100 selects, from the operation time record gathering table 130, all the records in which the identifier of the operator selected in Step S951 is coincident with the operator name 1306 of the operation time record gathering table 130. Next, the summary server 100 chooses, from within the selected records, the records in which the identifier of the window selected in Step S952 is coincident with the window title 1303 of the operation time record gathering table 130. Subsequently, the summary server 100 chooses, from within the selected records, the records in which the date 1301 and the time 1302 in the operation time record gathering table 130 correspond to the time-span selected in Step S953.

Next, the summary server 100 counts the number of selected records in which the criterion level 1305 indicates the dangerous level (S954). It should be noted that the number of records represents the number of operations each categorized as the dangerous level (referred to as dangerous operation count) among the operations with respect to the window selected in Step S952, which are done by the operator chosen in Step S951 during the time-span selected in Step S953.

Next, the summary server 100 counts the number of selected records in which the criterion level 1305 indicates the caution level (S955). It should be noted that the number of records represents the number of operations each categorized as the caution level (referred to as caution operation count) among the operations with respect to the window selected in Step S952, which are done by the operator chosen in Step S951 during the time-span selected in Step S953.

Next, the summary server 100 counts the number of selected records in which the criterion level 1305 indicates the standard level (S956). It should be noted that the number of records represents the number of operations each categorized as the standard level (referred to as standard operation count) among the operations with respect to the window selected in Step S952, which are done by the operator chosen in Step S951 during the time-span selected in Step S953.

Subsequently, the summary server 100 judges whether or not all the time-time spans included in the measurement target period are selected in Step S953. If any one of the time-spans serving as the measurement target time-spans is not selected, the summary server 100 selects the next time-span and executes Steps S954 to S956.

If all the time-spans are selected, the summary server 100 judges whether or not all the windows displayed on the worker's operation personal computer 10 are selected in Step S952. If any one of the windows displayed on the worker's operation personal computer 10 is not selected, the summary server 100 selects the next window, and executes Steps S953 to S956.

On the other hand, if all the windows are selected, the summary server 100 judges whether or not all the persons (operators) set for measurement are selected in Step S951. If any one of the operators set for measurement is not selected, the summary server 100 selects the next operator and executes Steps S952 to S956.

If all the operators are selected, the summary server 100 terminates the risk analyzing process.

Figure 19:
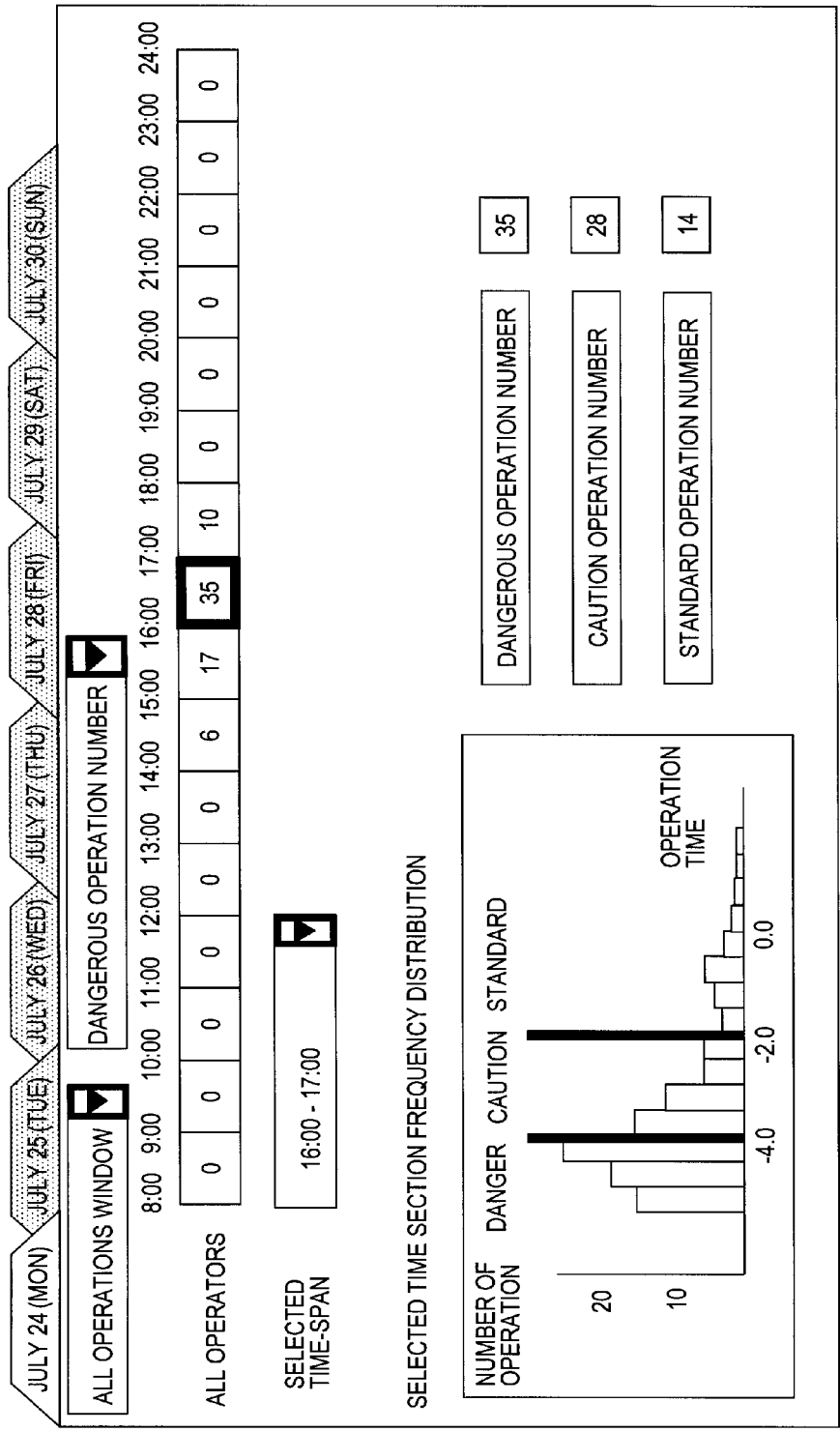
FIG. 19 is an explanatory diagram showing a risk analyzed data result window displayed on the manager's terminal in accordance with the embodiment of this invention.

FIG. 19 is an explanatory diagram showing a risk analyzed data result window 87 displayed on the manager's terminal 200 according to the embodiment of this invention.

The risk analyzed data result window 87 shows the result of analyzing the operation on July 24.

To be specific, the risk analyzed data result window 87 shows a dangerous operation number (dangerous operation count) of every operator per time-span with respect to every window. Further, the risk analyzed data result window 87 illustrates that the maximum dangerous operation count occurs in the time-span of 16:00 through 17:00.

Moreover, the risk analyzed data result window 87 contains a histogram related to the operation time of the operations conducted in the time-span of 16:00 through 17:00. Further, the risk analyzed data result window 87 shows the dangerous operation count of every operator with respect to every window in the time-span of 16:00 through 17:00. Still further, the risk analyzed data result window 87 shows a caution operation number (caution operation count) of every operator with respect to every window in the time-span of 16:00 through 17:00. Yet further, the risk analyzed data result window 87 shows a standard operation number (standard operation count) of every operator with respect to every window in the time-span of 16:00 through 17:00.

It should be noted that the summary server 100 generates the information displayed on the risk analyzed data result window 87 by statistically processing the results of the risk analyses. In addition, the summary server 100 may generate other items of information by statistically processing the results of the risk analyses.

For example, the summary server 100 may calculate the dangerous operation count, the caution operation count, and the standard operation count daily, weekly, monthly, and yearly as well as per time. Further, the summary server 100 may calculate a quantity of variation in the dangerous operation count, a quantity of variation in the caution operation count, and a quantity of variation in the standard operation count. Moreover, the summary server 100 may also calculate the dangerous operation count, the caution operation count, and the standard operation count not for every operator but for one of every department and section. Furthermore, the summary server 100 may calculate a risk contribution ratio of a specific operator in a way that divides the dangerous operation count of the specified operator by a total dangerous operation count of all the operators.

Moreover, the summary server 100 may calculate average operation time of all the operations categorized into the dangerous level. Similarly, the summary server 100 may calculate average operation time of all the operations categorized into one of the dangerous level and the caution level. Further, the summary server 100 may calculate a difference between a standard period of time and the shortest operation time.

Moreover, the summary server 100 may also output the alert when the calculated value satisfies a predetermined condition. Further, the summary server 100 may, when the calculated value satisfies the predetermined condition, instruct one of a part and whole of the worker's operation PCs 10 to output the alert.

For example, the summary server 100, when one of the dangerous operation count and the caution operation count exceeds the threshold value, instructs the worker's operation personal computer 10 to output the alert. Further, the summary server 100, when one of the quantity of variation in the dangerous operation count and the quantity of variation in the caution operation count exceeds the threshold value, instructs the worker's operation personal computer 10 to output the alert.

Figure 20:
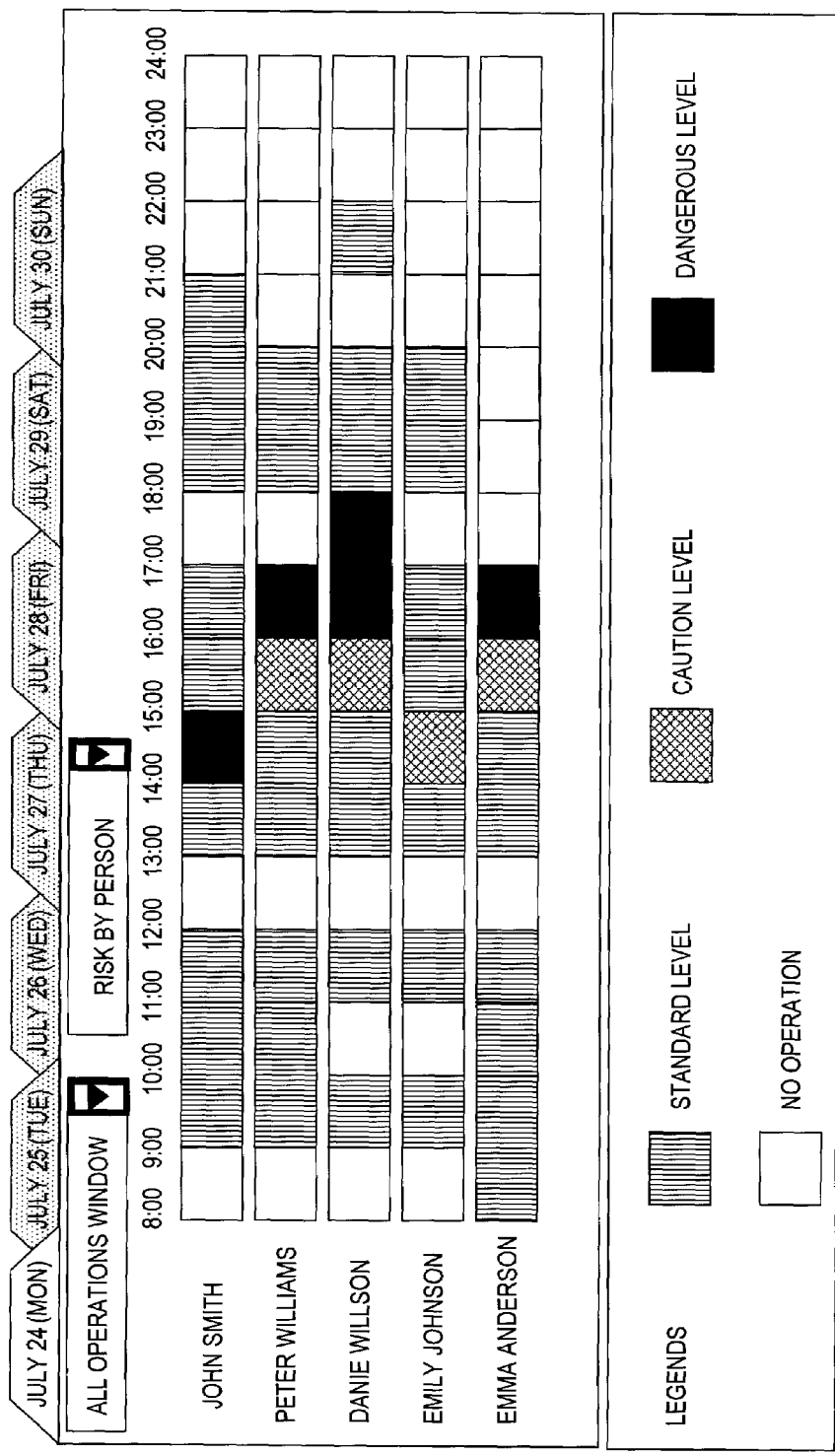
FIG. 20 is an explanatory diagram showing a risk analyzed data result window displayed on the manager's terminal in accordance with the embodiment of this invention.

FIG. 20 is an explanatory diagram showing a risk analyzed data result window 88 displayed on the manager's terminal 200 according to the embodiment of this invention.

The risk analyzed data result window 88 shows the result of analyzing the operation on July 24. To be specific, the risk analyzed data result window 88 shows what operation each operator performs in each time-span.

It should be noted that the manager's terminal 200 may display the result of the risk analysis as a different window.

As described above, the summary server 100 calculates the risk caused by the mis-operation and thus enables the manager's terminal 200 to display the information on the calculated risk.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
a plurality of first computers each operated by an operator and having a processor, a memory and an interface; and
a second computer coupled via a network to the plurality of first computers and having a processor, a memory and an interface,
wherein each of the plurality of first computers is configured to:
execute at least one software;
obtain operation information by the operator with respect to the at least one software to be executed;
receive an input of information from the operator;
display a confirm window for the operator to check whether the received input information is correct or not;
calculate operation time period about the displayed confirm window based on the obtained operation information; and
send the calculated operation time period about the confirm window to the second computer, and
wherein the second computer is configured to:
receive the operation time period about the confirm window; and
calculate the number of operations of which the received operation time period about the confirm window is shorter than a first threshold value.

2. The computer system according to claim 1,
wherein the confirm window includes a confirm operation area manipulated by the operator who confirms that the input information is valid, and
wherein the operation time period about the confirm window is a period of time since the confirm window is displayed till the confirm operation area included in the confirm window is manipulated.

3. The computer system according to claim 1, wherein the first threshold value is set for each confirm window.

4. The computer system according to claim 1, wherein the second computer calculates the number of operations of which the received operation time period about the confirm window is shorter than the first threshold value for each operator, each confirm window, and each time section.

5. The computer system according to claim 1, wherein the second computer outputs the calculated number of operations.

6. The computer system according to claim 1, wherein the second computer outputs an alert when the calculated number of operations is larger than a second threshold value.

7. The computer system according to claim 1, wherein second computer instructs the first computer to output the alert when the calculated number of operations is larger than the second threshold value.

8. The computer system according to claim 1,
wherein each of the plurality of first computers is configured to:
display an alert window when the calculated operation time period about the confirm window is shorter than the first threshold value;

calculate the operation time period about the displayed alert window based on the obtained operation information; and send the calculated operation time period about the alert window to the second computer, and wherein the second computer is configured to:

receive the operation time period about the received alert window; and calculate the number of operations of which the received operation time period about the alert window is shorter than a third threshold value.

9. The computer system according to claim 8, wherein the alert window includes an alert confirm operation area manipulated by the operator who confirms the alert information, and wherein the operation time period about the alert window is a period of time since the alert window is displayed till the alert confirm operation area included in the alert window is manipulated.

10. A method of calculating a risk caused by a mistake in operation in a computer system having a plurality of first computers each operated by an operator and a second computer coupled via a network to the plurality of first computers, the method comprising:

executing, by each of the plurality of first computers, at least one software:

obtaining, by each of the plurality of first computers, operation information by the operator with respect to the at least one software to be executed;

receiving, by each of the plurality of first computers, an input of information from the operator;

displaying, by each of the plurality of first computers, a confirm window for the operator to check whether the received input information is correct or not;

calculating, by each of the plurality of first computers, operation time period about the displayed confirm window based on the acquired operation information;

sending, by each of the plurality of first computers, the calculated operation time period about the confirm window to the second computer;

receiving, by the second computer, the operation time period about the confirm window; and calculating, by the second computer, the number of operations of which the received operation time period about the confirm window is shorter than a first threshold value.

11. The method according to claim 10, wherein the confirm window includes a confirm operation area manipulated by the operator who confirms that the input information is valid, and wherein the operation time period about the confirm window is a period of time since the confirm window is displayed till the confirm operation area included in the confirm window is manipulated.

12. The method according to claim 10, wherein the first threshold value is set for each confirm window.

13. The method according to claim 10, further comprising calculating, by the second computer, the number of operations of which the received operation time period about the confirm window is shorter than the first threshold value for each operator, each confirm window, and each time section.

14. The method according to claim 10, further comprising outputting, by the second computer, the calculated number of operations.

15. The method according to claim 10, further comprising outputting, by the second computer, an alert when the calculated number of operations is larger than a second threshold value.

16. The method according to claim 10, further comprising instructing, by the second computer, the plurality of first computers to output the alert when the calculated number of operations is larger than the second threshold value.

17. The method according to claim 10, further comprising:

displaying, by each of the plurality of first computers, an alert window when the calculated operation time period about the confirm window is shorter than the first threshold value;

calculating, by each of the plurality of first computers, the operation time period about the displayed alert window based on the obtained operation information;

sending, by each of the plurality of first computers, the calculated operation time period about the alert window to the second computer, receiving, by the second computer, the operation time period about the received alert window; and calculating, by the second computer, the number of operations of which the received operation time period about the alert window is shorter than a third threshold value.

18. The method according to claim 17, wherein the alert window includes an alert confirm operation area manipulated by the operator who confirms the alert information, and wherein the operation time period about the alert window is a period of time since the alert window is displayed till the alert confirm operation area included in the alert window is manipulated.

* * * * *